United States Patent
Yi et al.

(10) Patent No.: US 9,357,543 B2
(45) Date of Patent: May 31, 2016

(54) METHOD AND APPARATUS FOR RECEIVING DOWNLINK DATA IN WIRELESS COMMUNICATION SYSTEM

(71) Applicant: LG ELECTRONICS INC., Seoul (KR)

(72) Inventors: Yunjung Yi, Anyang-si (KR); Joonkui Ahn, Anyang-si (KR); Suckchel Yang, Anyang-si (KR); Hanbyul Seo, Anyang-si (KR); Bonghoe Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 14/391,347

(22) PCT Filed: Apr. 18, 2013

(86) PCT No.: PCT/KR2013/003310
§ 371 (c)(1),
(2) Date: Oct. 8, 2014

(87) PCT Pub. No.: WO2013/157872
PCT Pub. Date: Oct. 24, 2013

(65) Prior Publication Data
US 2015/0071099 A1    Mar. 12, 2015

Related U.S. Application Data

(60) Provisional application No. 61/750,815, filed on Jan. 10, 2013, provisional application No. 61/729,629, filed on Nov. 25, 2012, provisional application No. 61/723,747, filed on Nov. 7, 2012, provisional
(Continued)

(51) Int. Cl.
*H04W 72/04* (2009.01)
*H04B 7/26* (2006.01)
(Continued)

(52) U.S. Cl.
CPC ........... *H04W 72/042* (2013.01); *H04B 7/2656* (2013.01); *H04J 3/00* (2013.01);
(Continued)

(58) Field of Classification Search
CPC ..... H04L 5/0048; H04L 5/0023; H04L 5/001; H04L 5/1438; H04L 5/0053; H04L 5/0082; H04L 5/1469; H04W 28/18; H04W 72/042; H04W 24/10; H04B 7/2656; H04J 3/00
See application file for complete search history.

(56) References Cited

U.S. PATENT DOCUMENTS

| | | | |
|---|---|---|---|
| 8,867,442 B2 * | 10/2014 | Pelletier | H04W 76/048 370/328 |
| 2010/0124237 A1 * | 5/2010 | Chun | H04L 47/10 370/469 |

(Continued)

OTHER PUBLICATIONS

3GPP TS 36.213 V10.5.0, 3GPP; TSGRAN; E-UTRA; Physical layer procedures (Release 10):, Mar. 2012 See pp. 32-34.
(Continued)

*Primary Examiner* — Ajay Cattungal
(74) *Attorney, Agent, or Firm* — Dentons US LLP

(57) ABSTRACT

Provided is a method for receiving downlink data in a wireless communication system. User equipment (UE) receives downlink control information in a first subframe from a primary cell. The user equipment receives downlink data from a secondary cell in a second subframe over a physical downlink shared channel (PDSCH). The user equipment determines a transmission block size in accordance with the type of the carrier of the second subframe. The user equipment decodes the PDSCH on the basis of the downlink control information and the transmission block size.

17 Claims, 13 Drawing Sheets

Related U.S. Application Data application No. 61/723,298, filed on Nov. 6, 2012, provisional application No. 61/715,313, filed on Oct. 18, 2012, provisional application No. 61/655,488, filed on Jun. 5, 2012, provisional application No. 61/640,011, filed on Apr. 30, 2012, provisional application No. 61/635,275, filed on Apr. 18, 2012.

(51) Int. Cl.
*H04J 3/00* (2006.01)
*H04L 5/14* (2006.01)
*H04W 24/10* (2009.01)
*H04W 28/18* (2009.01)
*H04L 5/00* (2006.01)

(52) U.S. Cl.
CPC ............ *H04L 5/0053* (2013.01); *H04L 5/0082* (2013.01); *H04L 5/1438* (2013.01); *H04L 5/1469* (2013.01); *H04W 24/10* (2013.01); H04L 5/001 (2013.01); H04L 5/0023 (2013.01); H04L 5/0048 (2013.01); H04W 28/18 (2013.01)

(56) References Cited

U.S. PATENT DOCUMENTS

| | | | | |
|---|---|---|---|---|
| 2010/0195614 A1* | 8/2010 | Nimbalker | ........ | H04W 72/1289 370/330 |
| 2011/0081939 A1* | 4/2011 | Damnjanovic | ........ | H04W 52/08 455/522 |
| 2011/0141987 A1* | 6/2011 | Nam | ........ | H04L 1/0003 370/329 |
| 2012/0008574 A1* | 1/2012 | Xiao | ........ | H04L 1/0007 370/329 |
| 2012/0087396 A1* | 4/2012 | Nimbalker | ........ | H04L 1/1822 375/219 |
| 2012/0093073 A1* | 4/2012 | Lunttila | ........ | H04L 1/1607 370/328 |
| 2012/0207109 A1* | 8/2012 | Pajukoski | ........ | H04L 1/0029 370/329 |
| 2012/0281593 A1* | 11/2012 | Stewart | ........ | H04W 16/14 370/259 |
| 2013/0003664 A1* | 1/2013 | Frenne | ........ | H04W 72/1289 370/329 |
| 2013/0016649 A1* | 1/2013 | Damnjanovic | ........ | H04W 88/04 370/315 |
| 2013/0021932 A1* | 1/2013 | Damnjanovic | .... | H04W 52/0229 370/252 |
| 2013/0188590 A1* | 7/2013 | Aiba | ........ | H04L 1/1861 370/329 |
| 2013/0242880 A1* | 9/2013 | Miao | ........ | H04L 5/001 370/329 |
| 2013/0258978 A1* | 10/2013 | Aiba | ........ | H03M 13/136 370/329 |
| 2013/0259011 A1* | 10/2013 | Nakashima | ........ | H04W 72/0473 370/336 |
| 2014/0071931 A1* | 3/2014 | Lee | ........ | H04L 5/001 370/329 |
| 2014/0328316 A1* | 11/2014 | Chmiel | ........ | H04W 72/12 370/330 |
| 2015/0023177 A1* | 1/2015 | Xi | ........ | H04L 5/001 370/241 |
| 2015/0117291 A1* | 4/2015 | Seo | ........ | H04L 5/001 370/312 |

OTHER PUBLICATIONS

Catt, "PDSCH TBS determination for additional TDD special subframe configurations", R1-121105, 3GPP TSG-RAN WG1 Meeting #68bis, Jeju, Korea, Mar. 26-30, 2012 See pp. 1-2.

Panasonic, "Channels and signals for additional carrier type", R1-121140, 3GPP TSG-RAN WG1 Meeting #68bis, Jeju, Korea, Mar. 26-30, 2012 See pp. 1-3.

CMCC, "Discussionon additional special subframe configuration", R1-121712, 3GPP TSG-RAN WG1 Meeting #68bis, Jeju, Korea, Mar. 26-30, 2012 See pp. 2-5.

Ericsson et al., "Discussion on additional special subframe configuration for LTE TDD", R1-121402, 3GPP TSG-RAN WG1 Meeting #68bis, Jeju, Korea, Mar. 26-30, 2012 See pp. 1-3.

* cited by examiner

METHOD AND APPARATUS FOR RECEIVING DOWNLINK DATA IN WIRELESS COMMUNICATION SYSTEM

This application is a 35 USC §371 National Stage entry of International Application No. PCT/KR2013/003310, filed Apr. 18, 2013, and claims priority to U.S. Provisional Application Nos. 61/750,815 filed Jan. 10, 2013, 61/729,629 filed Nov. 25, 2012, 61/723,747 filed Nov. 7, 2012, 61/723,298 filed Nov. 6, 2012, 61/715,313 filed Oct. 18, 2012, 61/655,488 filed Jun. 5, 2012, 61/640,011 filed Apr. 30, 2012, and 61/635,275 filed Apr. 18, 2012, all of which are hereby incorporated by reference in their entirety.

BACKGROUND OF THE INVENTION

1. Field of the Invention

The present invention relates to wireless communication and, more particularly, to a method of receiving downlink data and an apparatus using the same.

2. Related Art

Long Term Evolution (LTE) based on $3^{rd}$ Generation Partnership Project (3GPP) Technical Specification (TS) release 8 is a strong next-generation mobile communication standard. Recently, the standardization of LTE-Advanced (LTE-A) based on 3GPP TS release 10 which supports multiple carriers is in progress.

As disclosed in 3GPP TS 36.211 V10.4.0 (2011-12) "Evolved Universal Terrestrial Radio Access (E-UTRA); Physical Channels and Modulation (Release 10)", reference signals, such as a Cell-specific Reference Signal (CRS), a Primary Synchronization Signal (PSS), and a Secondary Synchronization Signal (SSS), and control channels, such as a physical downlink control channel (PDCCH) and a physical broadcast channel (PBCH), are defined in the physical layer of 3GPP LTE/LTE-A.

Meanwhile, in LTE releases 8/9/10, a reference signal and a control are transmitted in all the DL subframes. In the next-generation system, however, it is expected that carriers on which part of or the entire reference signal and/or control channel is not transmitted in order to use radio resources more efficiently will be introduced. Such type of carrier is called a New Carrier Type (NCT).

SUMMARY OF THE INVENTION

The present invention provides a method of receiving downlink data in a wireless communication system and an apparatus using the same.

The present invention also provides a method of determining a transport block size and an apparatus using the same.

In an aspect, a method for receiving downlink data in a wireless communication system, is provided. The method includes receiving downlink control information in a first subframe from a primary cell, receiving downlink data in a second subframe through a physical downlink shared channel (PDSCH) from a secondary cell, determining a transport block size based on a carrier type of the second subframe, and decoding the PDSCH based on the downlink control information and the transport block size.

In another aspect, a user equipment (UE) in a wireless communication system is provided. The UE includes a radio frequency unit configured to transmit and receive radio signals, and a processor connected to the radio frequency unit and configured to receive downlink control information in a first subframe from a primary cell, receive downlink data in a second subframe through a physical downlink shared channel (PDSCH) from a secondary cell, determine a transport block size based on a carrier type of the second subframe, and decode the PDSCH based on the downlink control information and the transport block size.

The transport block size may be determined based on a position of an Orthogonal Frequency Division Multiplexing (OFDM) symbol of the second subframe at which the decoding of the PDSCH is started.

The transport block size may be determined based on whether or not the second subframe includes a reference signal for channel measurement.

The transport block size may be determined based on a position of an Orthogonal Frequency Division Multiplexing (OFDM) symbol of the second subframe at which the decoding of the PDSCH is started and whether or not the second subframe includes a reference signal for channel measurement.

The second subframe may be a special subframe in a Time Division Duplex (TDD) system, and the transport block size may be determined based on a special subframe configuration of the second subframe and a position of an Orthogonal Frequency Division Multiplexing (OFDM) symbol of the second subframe at which the decoding of the PDSCH is started.

The second subframe may be a special subframe in a Time Division Duplex (TDD) system, and the transport block size may be determined based on a number of Orthogonal Frequency Division Multiplexing (OFDM) symbols used to send the PDSCH.

A transport block size in a New Carrier Type (NCT) subframe can be determined more accurately.

DESCRIPTION OF EXEMPLARY EMBODIMENTS

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

User Equipment (UE) may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

In general, a Base Station (BS) refers to a fixed station communicating with UE. The BS may also be called another terminology, such as an evolved-NodeB (eNB), a Base Transceiver System (BTS), or an access point.

Hereinafter, the application of the present invention based on 3GPP LTE based on 3GPP release 8 is described. This application is illustrative, and the present invention may be applied to a variety of wireless communication networks. LTE hereinafter includes LTE and/or LTE-A.

3GPP LTE supports both Frequency Division Duplex (FDD) and Time Division Duplex (TDD). In FDD, UL transmission and DL reception occur at same frequency. A UE that supports full duplex can simultaneously perform DL transmission and UL reception. A UE that supports half duplex cannot simultaneously perform DL transmission and UL reception.

Figure 1:
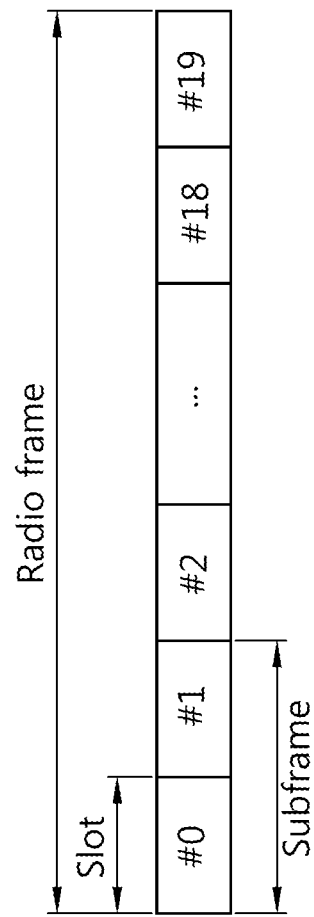
FIG. 1 illustrates the configuration of a radio frame in 3GPP LTE FDD.

FIG. 1 illustrates the configuration of a radio frame in 3GPP LTE FDD.

For the structure, reference may be made to section 4.1 of 3rd Generation Partnership Project (3GPP) TS 36.211 V10.4.0 (2011-12) "Technical Specification Group Radio Access Network; Evolved Universal Terrestrial Radio Access (E-UTRA); Physical channels and modulation (Release 10)".

Referring to FIG. 1, a radio frame includes 10 subframes. A subframe includes two contiguous slots. The slots within the radio frame are assigned slot numbers #0 to #19. The time that is taken to send a single subframe is called a Transmission Time Interval (TTI). The TTI may be a scheduling unit for data transmission. For example, the length of a single radio frame may be 10 ms, the length of a single subframe may be 1 ms, and the length of a single slot may be 0.5 ms.

A single slot includes a plurality of Orthogonal Frequency Division Multiplexing (OFDM) symbols in a time domain and includes a plurality of subcarriers in a frequency domain. The OFDM symbol is for representing a single symbol period because 3GPP LTE uses OFDMA in downlink and may be called another terminology depending on multiple access methods. For example, if SC-FDMA is used as an uplink multiple access scheme, an OFDM symbol may be called an SC-FDMA symbol. A Resource Block (RB) is a resource allocation unit, and the RB includes a plurality of contiguous subcarriers in a single slot.

The structure of the radio frame shown in FIG. 1 is only an example. Accordingly, the number of subframes included in a radio frame, the number of slots included in a subframe, or the number of OFDM symbols included in a slot may be changed in various ways. In 3GPP LTE, a single slot is defined to include 7 OFDM symbols in a normal Cyclic Prefix (CP), and a single slot is defined to include 6 OFDM symbols in an extended CP.

Figure 2:
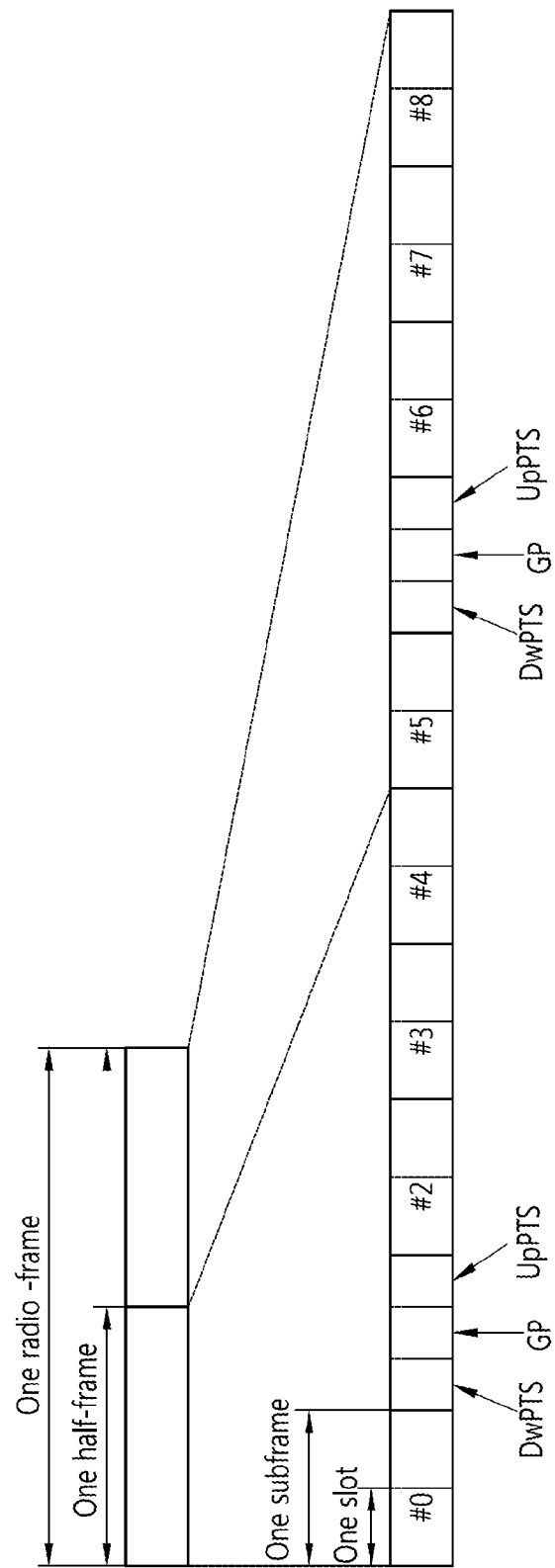
FIG. 2 illustrates the configuration of a radio frame in 3GPP LTE TDD.

FIG. 2 illustrates the configuration of a radio frame in 3GPP LTE TDD.

For the structure, reference may be made to section 4.2 of 3rd Generation Partnership Project (3GPP) TS 36.211 V10.3.0 (2011-09) "Technical Specification Group Radio Access Network; Evolved Universal Terrestrial Radio Access (E-UTRA); Physical channels and modulation (Release 10)". A frame structure for TDD can be referred to as a frame structure type 2.

A radio frame for TDD is similar with a radio frame for FDD. In TDD, a radio frame includes at least one DL subframe, at least on UL subframe and at least one a special subframe. A table 1 shows a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denote a DL subframe 'U' denote a UL subframe and 'S' denotes a special subframe. When UL-DL configuration is received from a BS, a UE can acknowledges which subframe is a DL subframe or a UL subframe in accordance with the UL-DL configuration.

Subframes having indexes #1 and #6 may be referred as a special subframe that includes a downlink pilot time slot (DwPTS), a guard period (GP) and a uplink pilot time slot (UpPTS). The DwPTS can be used for initial cell search, synchronization or channel estimation. The UpPTS can be used for channel estimation at a BS and uplink time alignment with a UE. The GP is an interval for mitigating an uplink interference due to a multi-path delay between DL and UL.

Figure 3:
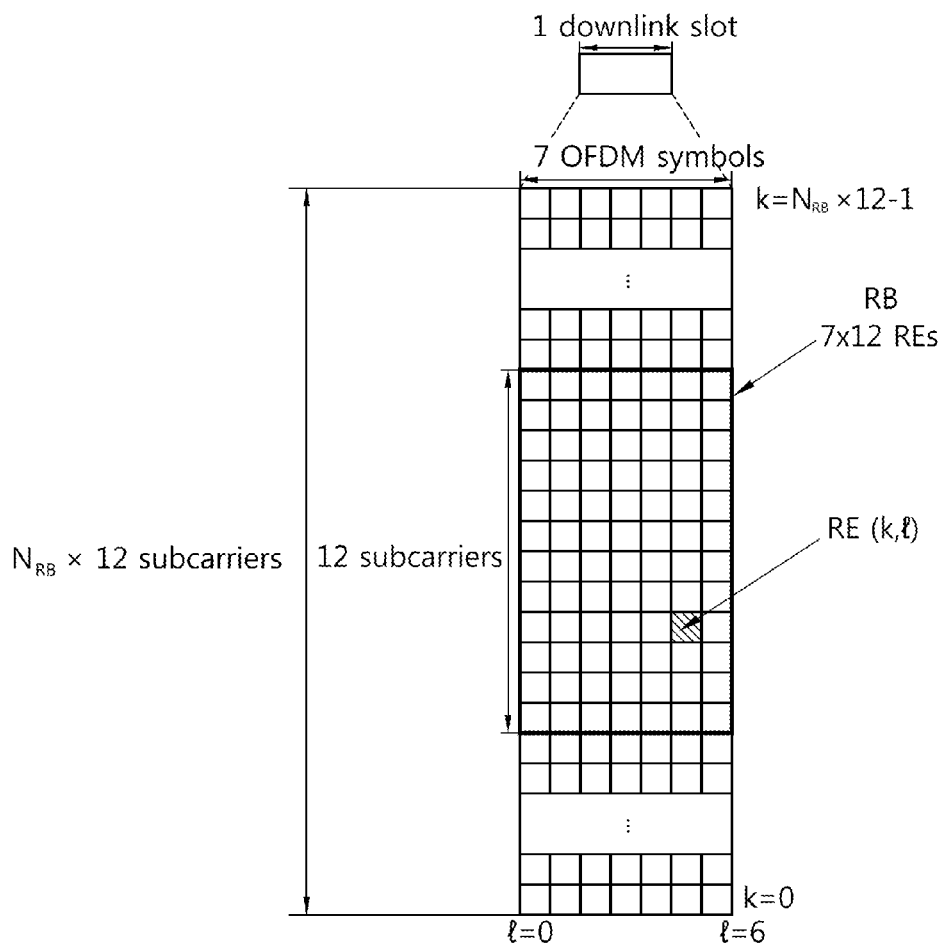
FIG. 3 illustrates an example of the resource grid of a single downlink slot.

FIG. 3 illustrates an example of the resource grid of a single downlink slot.

A downlink slot includes a plurality of OFDM symbols in a time domain and includes an $N_{RB}$ number of RBs in a frequency domain. The number of RBs $N_{RB}$ included in a downlink slot depends on a downlink transmission bandwidth configured in a cell. For example, in an LTE system, the number of RBs $N_{RB}$ may be any a single of 60 to 110. A single RB includes a plurality of subcarriers in a frequency domain. An uplink slot may have the same structure as the downlink slot.

Each element on the resource grid is referred to as a Resource Element (RE). The RE on the resource grid may be identified by an index pair (k,l) within a slot. In this case, k (k=0, ..., $N_{RB} \times 12-1$) is a subcarrier index in a frequency domain, and l (l=0, ..., 6) is an OFDM symbol index in a time domain.

In this case, a single RB is illustrated as including 7×12 REs, including 7 OFDM symbols in a time domain and 12 subcarriers in a frequency domain, but the number of OFDM symbols and the number of subcarriers within an RB are not limited thereto. The number of OFDM symbols and the number of subcarriers may be changed in various ways depending on the length of a CP, frequency spacing, etc.

Figure 4:
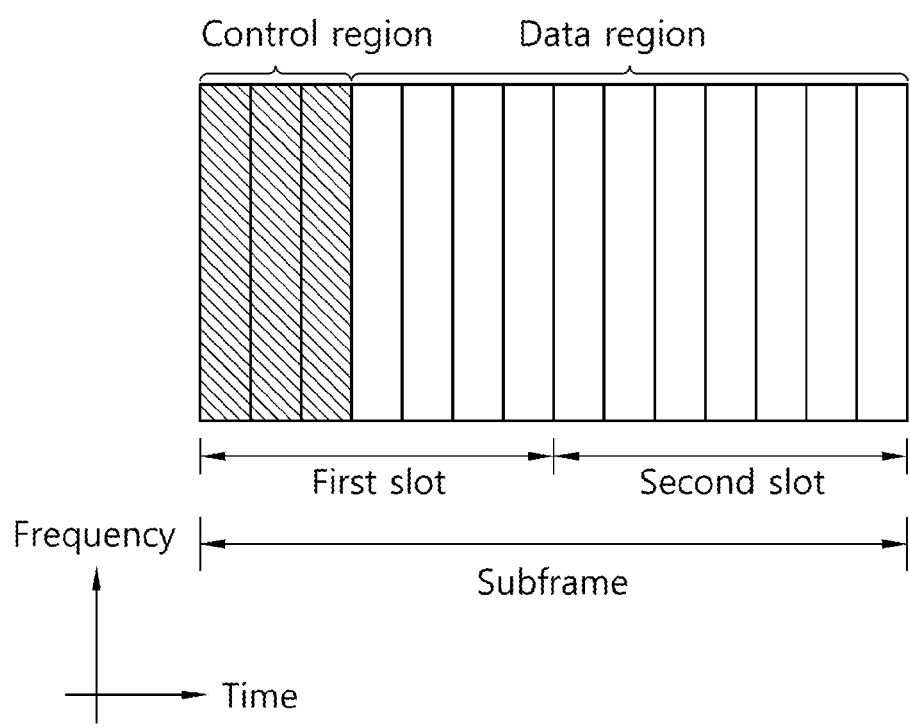
FIG. 4 illustrates the structure of a downlink subframe.

FIG. 4 illustrates the configuration of a downlink subframe.

A downlink (DL) subframe is divided into a control region and a data region in a time domain. The control region includes a maximum of former 3 OFDM symbols in a first slot within the DL subframe, but the number of OFDM symbols included in the control region may be changed. Control channels different from a physical downlink control channel (PDCCH) are allocated to the control region, and PDSCHs are allocated to the data region.

As disclosed in 3GPP TS 36.211 V10.4.0, a physical downlink channel in 3GPP LTE can include a physical broadcast channel (PBCH), a physical control format indicator channel (PCFICH), a PDCCH and a physical hybrid-ARQ indicator channel (PHICH).

A PBCH is transmitted in first 4 OFDM symbols of a second slot of a first subframe in a radio frame. The PBCH can carry essential system information for the UE to communicate with a BS. The system information on the PBCH may be referred as master information block (MIB). System information on PDSCH indicated by a PDCCH may be referred as system information block (SIB).

A PCFICH transmitted in the first OFDM symbol of a subframe carries a Control Format Indicator (CIF) indicative of the number of OFDM symbols (i.e., the size of a control region) used to transmit control channels within the subframe. UE may receive a CIF on a PCFICH and then monitor a PDCCH. The PCFICH is transmitted through the fixed PCFICH resources of the subframe without using blind decoding.

A PHICH carries positive-acknowledgement (ACK)/negative-acknowledgement (NACK) signals for a uplink Hybrid Automatic Repeat Request (HARQ). The ACK/NACK signal of UL data on a PUSCH transmitted by UE is transmitted through a PHICH.

A PDCCH occupies a maximum of four OFDM symbols in the time domain and is transmitted over the entire system band in the frequency domain. Control information transmitted through a PDCCH is called Downlink Control Information (DCI). DCI may include information about the resource allocation of a PDSCH (this is also called a DL grant), the resource allocation of a PUSCH (this is also called an UL grant), a set of transmit power control commands for each UE within a specific UE group, and/or the activation of a Voice over Internet Protocol (VoIP).

In 3GPP LTE, a blind decoding us used for PDCCH detection. In blind decoding, a UE damasks an identifier with a Cyclic Redundancy Check (CRC) of a received PDCCH (i.e. a candidate PDCCH) and checks CRC error to confirm that the received PDCCH is destined to the UE.

A BS determines a PDCCH format based on DCI to be transmitted to UE, attaches a CRC to the DCI, and masks a unique identifier (this is also called a Radio Network Temporary Identifier (RNTI)) the CRC depending on the owner or use of a PDCCH.

A control region within a subframe includes a plurality of Control Channel Elements (CCEs). The CCE is a logical allocation unit used to provide a PDCCH with a coding rate depending on the state of a radio channel, and the CCE corresponds to a plurality of Resource Element Groups (REGs). The REG includes a plurality of REs. The format of a PDCCH and the number of bits of an available PDCCH are determined depending on association between the number of CCEs and a coding rate provided by the CCEs.

A single REG includes 4 Res, and a single CCE includes 9 REGs. In order to configure a single PDCCH, {1, 2, 4, 8} CCEs may be used. Each of the elements of {1, 2, 4, 8} is called a CCE aggregation level.

The number of CCEs used to send a PDDCH is determined by a BS depending on a channel state. For example, UE having a good DL channel state may use a single CCE to send a PDCCH. UE having a poor DL channel state may use 8 CCEs to send a PDCCH.

A control channel including one or more CCEs is mapped to physical resources, after interleaving is performed in unit of an REG and cyclic shift based on a cell identifier (ID) is then performed.

Figure 5:
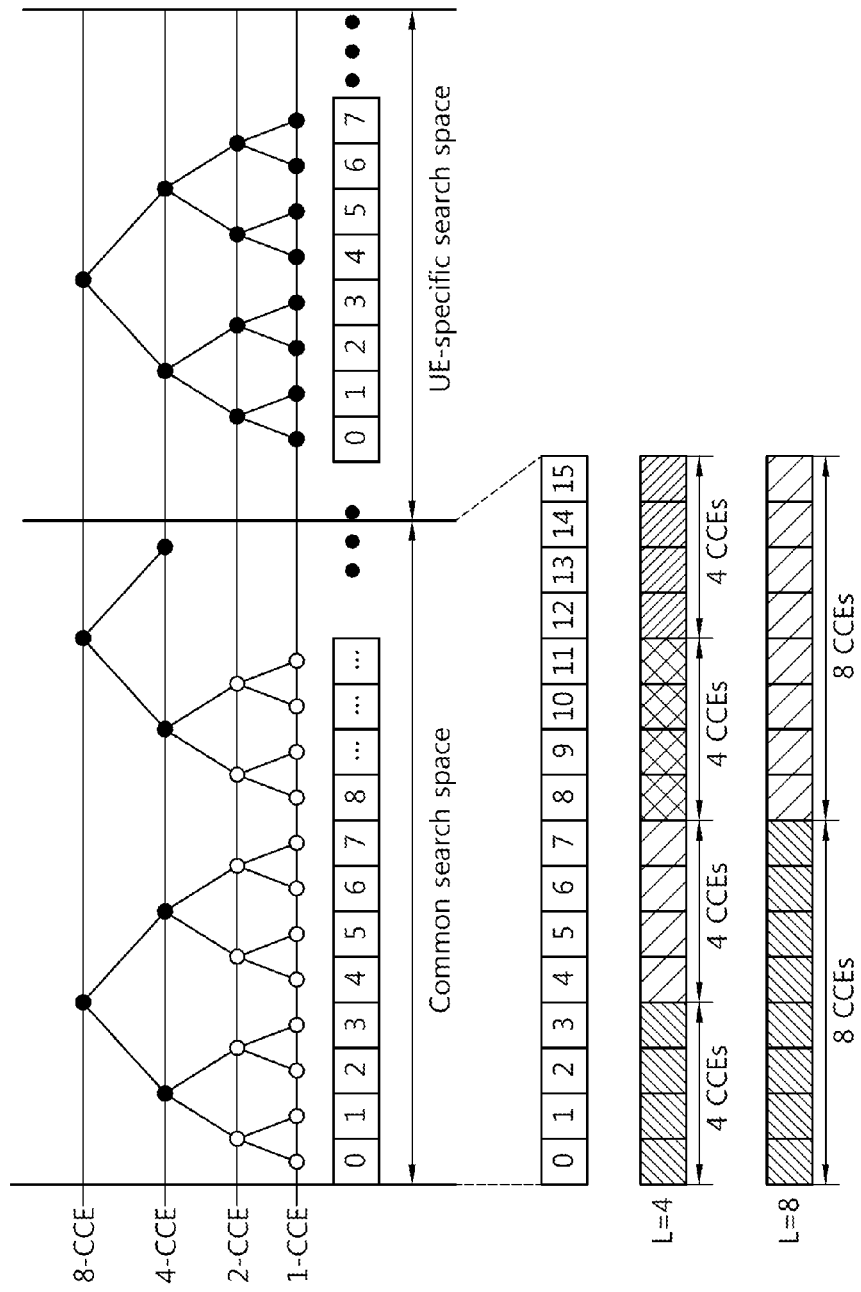
FIG. 5 is an exemplary diagram illustrating the monitoring of a physical downlink control channel (PDCCH).

FIG. 5 is an exemplary diagram illustrating the monitoring of a PDCCH. For the monitoring of the PDCCH, reference may be made to section 9 of 3GPP TS 36.213 V10.4.0 (2011-012) "Technical Specification Group Radio Access Network; Evolved Universal Terrestrial Radio Access (E-UTRA); Physical layer procedures (Release 10)".

A UE is unable to know that its own PDCCH is transmitted using what CCE aggregation level or what DCI format in which place within a control region. Since a plurality of PDCCHs may be transmitted within a single subframe, UE monitors the plurality of PDCCHs for every subframe. In this case, the term 'monitoring' means that the UE attempts to decode the PDCCH depending on a PDCCH format.

In 3GPP LTE, in order to reduce a load resulting from blind decoding, a search space is used. The search space may be called a monitoring set of CCEs for a PDCCH. UE monitors a PDCCH within a search space.

A search space is divided into a common search space and a UE-specific search space. The common search space is a space where a PDCCH having common control information is searched for. The common search space includes 16 CCEs having a CCE index 0 to a CCE index 15 and supports a PDCCH having a {4, 8} CCE aggregation level. However, a PDCCH (DCI formats 0 and 1A) that carries UE-specific information may also be transmitted in the common search space. The UE-specific search space supports a PDCCH having a {1, 2, 4, 8} CCE aggregation level.

Table 2 below indicates the number of PDCCH candidates monitored by UE.

TABLE 2

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The size of a search space is defined in Table 2, and the start point of the search space is differently defined in a common search space and a UE-specific search space. A start point of the common search space is fixed irrespective of a subframe, whereas a start point of the UE-specific search space may be different in each subframe depending on a UE identifier (e.g., C-RNTI), a CCE aggregation level and/or a slot number within a radio frame. If the start point of a UE-specific search space is within a common search space, the UE-specific search space and the common search space may overlap with each other.

In Equation 2, $Y_{-1}=n_{RNTI}\neq 0$, A=39827, D=65537, k=floor $(n_s/2)$, and $n_s$ is a slot number within a radio frame.

When UE monitors a PDCCH based on a C-RNTI, a DCI format and a search space to be monitored are determined depending on transmission mode of a PDSCH. The following table shows an example of the monitoring of a PDCCH in which a C-RNTI is set.

TABLE 2

| TRANSMISSION MODE | DCI FORMAT | SEARCH SPACE | TRANSMISSION MODE OF PDSCH ACCORDING TO PDCCH |
|---|---|---|---|
| Mode 1 | DCI format 1A | common and UE-specific | Single antenna port, port 0 |
|  | DCI format 1 | UE-specific | Single antenna port, port 0 |
| Mode 2 | DCI format 1A | common and UE-specific | Transmit diversity |
|  | DCI format 1 | UE-specific | Transmit diversity |
| Mode 3 | DCI format 1A | common and UE-specific | Transmit diversity |
|  | DCI format 2A | UE-specific | Cyclic Delay Diversity (CDD) or transmit diversity |
| Mode 4 | DCI format 1A | common and UE-specific | Transmit diversity |
|  | DCI format 2 | UE-specific | Closed-loop spatial multiplexing |
| Mode 5 | DCI format 1A | common and UE-specific | Transmit diversity |
|  | DCI format 1D | UE-specific | Multi-user Multiple Input Multiple Output (MU-MIMO) |
| Mode 6 | DCI format 1A | common and UE-specific | Transmit diversity |
|  | DCI format 1B | UE-specific | Closed-loop spatial multiplexing |
| Mode 7 | DCI format 1A | common and UE-specific | If the number of PBCH transmission ports is 1, single antenna port, port 0, and if not, transmit diversity |
|  | DCI format 1 | UE-specific | a single antenna port, port 5 |
| Mode 8 | DCI format 1A | common and UE-specific | If the number of PBCH transmission ports is 1, single antenna port, port 0, and if not, transmit diversity |
|  | DCI format 2B | UE-specific | Dual layer transmission (port 7 or 8), or a single antenna port, port 7 or 8 |
| Mode 9 | DCI format 1A | common and UE-specific | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE-specific | Up to 8 layer transmission, ports 7-14 |

In an aggregation level $L \in \{1, 2, 4, 8\}$, a search space $S^{(L)}_k$ is defined as a set of PDCCH candidates. A CCE corresponding to the PDCCH candidates m of the search space $S^{(L)}_k$ is given as follows.

$$L \cdot \{(Y_k+m') \bmod \lfloor N_{CCE,k}/L \rfloor\}+i \quad \text{[Equation 1]}$$

In Equation 1, i=0, 1, ..., L−1, m=0, ..., $M^{(L)}$−1, and $N_{CCE,k}$ is a total number of CCEs that may be used to send a PDCCH within a control region of a subframe k. The control region includes a set of CCEs numbered from 0 to $N_{CCE,k}$−1. $M^{(L)}$ is the number of PDCCH candidates in a CCE aggregation level L in a given search space.

If a Carrier Indicator Field (CIF) is set in UE, m'=m+$M^{(L)}$ $n_{cif}$. $n_{cif}$ is a value of the CIF. F a CIF is not set in UE, m'=m.

In a common search space, $Y_k$ is set to 2 aggregation levels and is set to 0 in relation to L=4 and L=8.

In a UE-specific search space having an aggregation level L, a parameter $Y_k$ is defined as follows.

$$Y_k=(A \cdot Y_{k-1}) \bmod D \quad \text{[Equation 2]}$$

Figure 6:
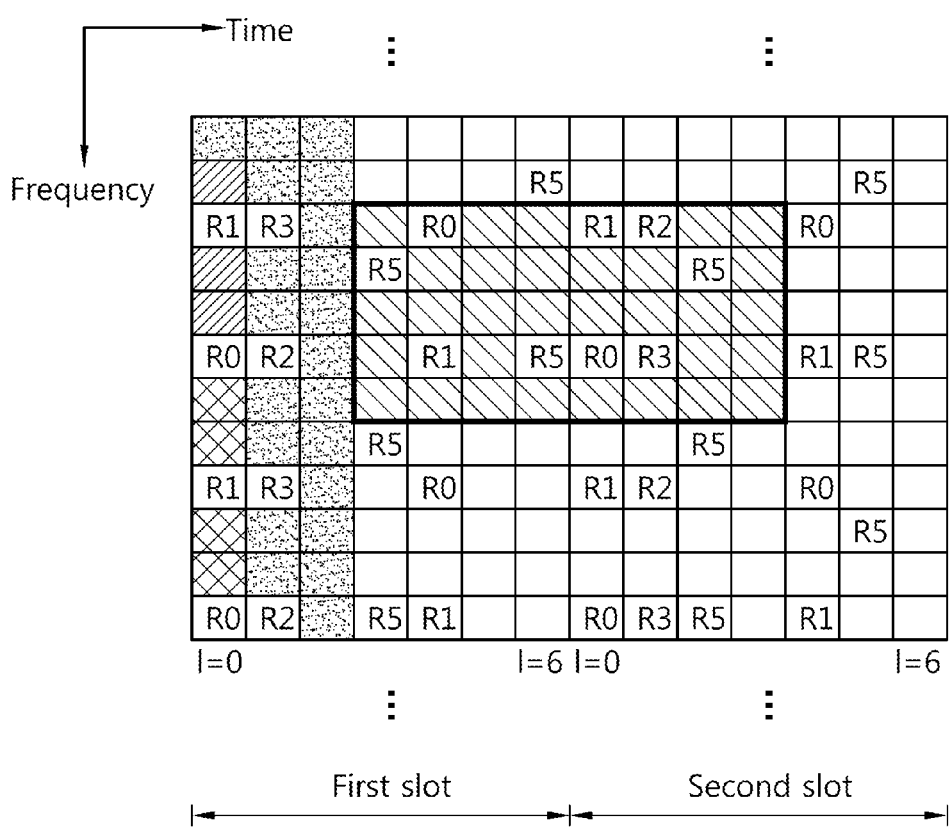
FIG. 6 illustrates an example in which reference signals and control channels are disposed in a downlink subframe of 3GPP LTE.

FIG. 6 illustrates an example in which reference signals (RSs) and control channels are disposed in a downlink subframe of 3 GPP LTE.

A control region includes first 3 OFDM symbols, and a data region in which a PDSCH is transmitted includes the remaining OFDM symbols.

A Physical Control Format Indicator Channel (PCFICH), a Physical Hybrid-ARQ Indicator Channel (PHICH) and/or a PDCCH are transmitted in the control region. The CFI of the PCFICH indicates the 3 OFDM symbols. A region of the control region other than resources through which the PCFICH and/or the PHICH are transmitted becomes a PDCCH region in which a PDCCH is monitored.

Furthermore, various types of reference signals are also transmitted in the DL subframe.

A Cell-specific Reference Signal (CRS) may be received by all pieces of UEs within a cell and is transmitted over the entire DL band. In FIG. 5, 'R0' is a Resource Element (RE) in which the CRS of a first antenna port is transmitted, 'R1' is an RE in which the CRS of a second antenna port is transmitted, 'R2' is an RE in which the CRS of a third antenna port is transmitted, and 'R3' is an RE in which the CRS of a fourth antenna port is transmitted.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

In Equation 3, m=0, 1, . . . , $2N_{maxRB}-1$, $N_{maxRB}$ is a maximum number of RBs, ns is a slot number within a radio frame, and l is an OFDM symbol number within a slot.

A pseudo-random sequence c(i) is defined by the following gold sequence having a length of 31.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 4]}$$

In Equation 4, Nc=1600, and a first m-sequence is initialized to $x_1(0)=1$, $x_1(n)=0$, m=1, 2, . . . , 30.

A second m-sequence is initialized to $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the Physical Cell Identity (PCI) of a cell. $N_{CP}=1$ in a normal CP, and $N_{CP}=0$ in an extended CP.

Furthermore, a UE-specific Reference Signal (URS) may be transmitted. A CRS is transmitted in the entire region of a subframe, whereas an URS is transmitted within the data region of a subframe and used to demodulate a PDSCH. In FIG. 5, 'R5' indicates an RE in which an URS is transmitted. The URS is also called a Dedicated Reference Signal (DRS) or a Demodulation Reference Signal (DM-RS).

The URS is transmitted only in an RB to which a corresponding PDSCH is mapped. In FIG. 5, although R5 is indicated in regions other than a region in which a PDSCH is transmitted, this is for indicating the location of an RE to which an URS is mapped.

The URS is used by only UE that receives a corresponding PDSCH. An RS sequence $r_{ns}(m)$ for US is given in Equation 3. In this case, m=0, 1, . . . , $12N_{PDSCH,RB}-1$, and $N_{PDSCH,RB}$ is the number of RBs used to send a corresponding PDSCH. A pseudo-random sequence generator is initialized to $c_{init}=(\text{floor}(ns/2)+1)(2N^{cell}_{ID}+1)2^{16}+n_{RNTI}$ at the start of each subframe. $n_{RNTI}$ is the identifier of UE.

An URS may be transmitted through a single antenna, but may be transmitted through multiple antennas. If an URS is transmitted through multiple antennas, a pseudo-random sequence generator is initialized to $c_{init}=(\text{floor}(ns/2)+1)(2N^{cell}_{ID}+1)2^{16}+n_{SCID}$ at the start of each subframe. $n_{SCID}$ is a parameter obtained from a DL grant (e.g., DCI format 2B or 2C) related to PDSCH transmission.

Meanwhile, a PDCCH is monitored in a limited region called a control region within a subframe, and a CRS transmitted in all bands is used in a PDCCH in order to demodulate the PDCCH. As the type of control information is diversified and the amount of control information is increased, the flexibility of scheduling using only an existing PDCCH is low. Furthermore, in order to reduce a load due to CRS transmission, an enhanced physical downlink control channel (EPDCCH) is being introduced.

Figure 7:
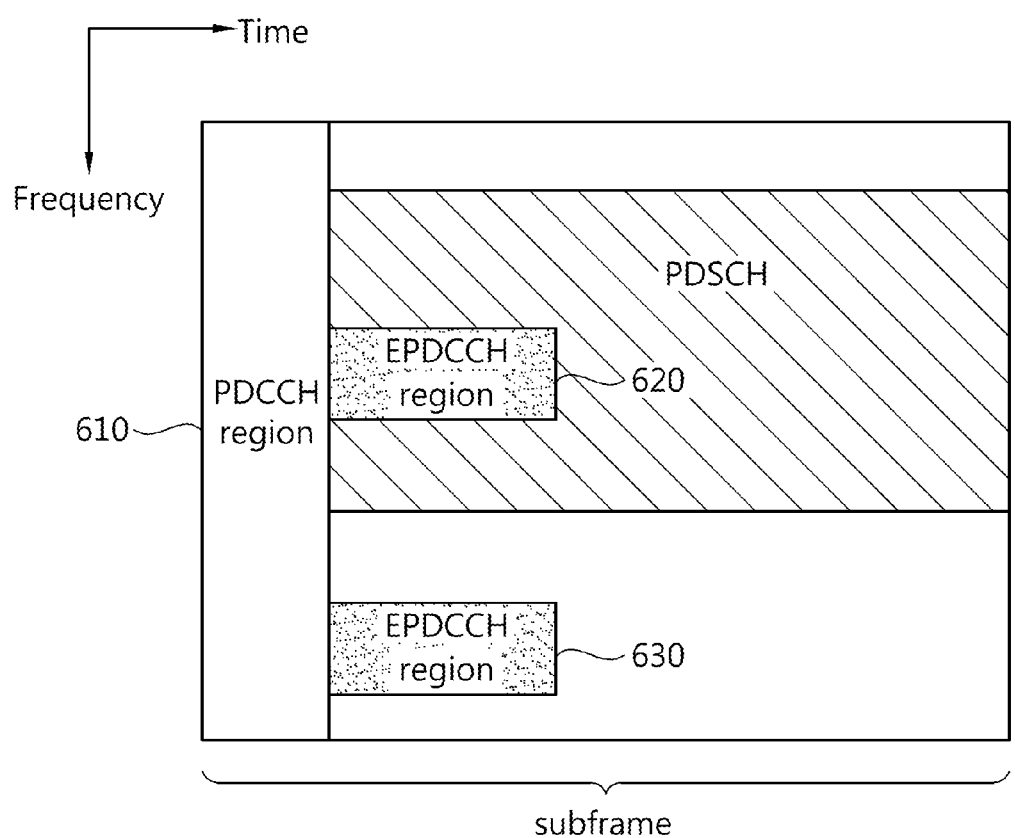
FIG. 7 is an example of a subframe having an Enhanced PDCCH (EPDCCH).

FIG. 7 is an example of a subframe having an EPDCCH.

The subframe may include zero or more PDCCH region 710 and zero or more EPDCCH regions 720 and 730.

UE monitors an EPDCCH in the EPDCCH regions 720 and 730. The PDCCH region 710 is located within former 4 OFDM symbols within a subframe, whereas the EPDCCH regions 720 and 730 may be flexibly scheduled in OFDM symbols after the PDCCH region 710.

One or more EPDCCH regions 720 and 730 may be assigned to UE, and the UE may monitor an EPDCCH in the assigned EPDCCH regions 720 and 730.

A BS may inform UE of information about the number/location/size of the EPDCCH regions 720 and 730 and/or a subframe in which an EPDCCH will be monitored through an RRC message.

In the PDCCH region 710, a PDCCH may be demodulated based on a CRS. In the EPDCCH regions 720 and 730, a demodulation (DM) RS not a CRS may be defined in order to demodulate an EPDCCH. A corresponding DM RS may be transmitted in corresponding EPDCCH regions 720 and 730.

An RS sequence $r_{ns}(m)$ for a DM RS is the same as Equation 3. In this case, m=0, 1, . . . , $12N_{RB}-1$, and $N_{RB}$ is a maximum number of RBs. A pseudo-random sequence generator may be initialized to $c_{init}=(\text{floor}(ns/2)+1)(2N_{EPDCCH,ID}+1)2^{16}+n_{EPDCCH,SCID}$ at the start of each subframe. ns is a slot number within a radio frame, $N_{EPDCCH,ID}$ is a cell index related to a corresponding EPDCCH region, and $n_{EPDCCH,SCID}$ is a parameter given from higher layer signaling.

Each of the EPDCCH regions 720 and 730 may be used in scheduling for a different cell. For example, an EPDCCH within the EPDCCH region 720 may carry scheduling information for a first cell, and an EPDCCH within the EPDCCH region 730 may carry scheduling information for a second cell.

When an EPDCCH is transmitted through multiple antennas in the EPDCCH regions 720 and 730, the same precoding as that of an EPDCCH may be applied to DM RSs within the EPDCCH regions 720 and 730.

If a PDCCH uses a CCE as a transmission resource unit, a transmission resource unit for an EPDCCH is called an enhanced Control Channel Element (ECCE). An aggregation level may be defined as a resource unit for monitoring an EPDCCH. For example, assuming that 1 ECCE is a minimum resource for an EPDCCH, an aggregation level L={1, 2, 4, 8, 16} may be defined.

Hereinafter, an EPDCCH search space may correspond to an EPDCCH region. One or more EPDCCH candidates may be monitored in the EPDCCH search space every one or more aggregation levels.

Resource allocation for an EPDCCH is described below.

An EPDCCH is transmitted using one or more ECCEs. An ECCE includes a plurality of enhanced Resource Element Groups (EREGs). An ECCE may include 4 EREGs or 8 EREGs depending on the type and CP of a subframe. For example, an ECCE may include 4 EREGs in a normal CP, and an ECCE may include 8 EREGs in an extended CP.

A Physical Resource Block (PRB) pair refers to two PRBs having the same RB number in a single subframe. That is, a PRB pair refers to the first PRB of a first slot and the second PRB of a second slot in the same frequency domain. In a normal CP, a PRB pair includes 14 OFDM symbols and 12 subcarriers.

Figure 8:
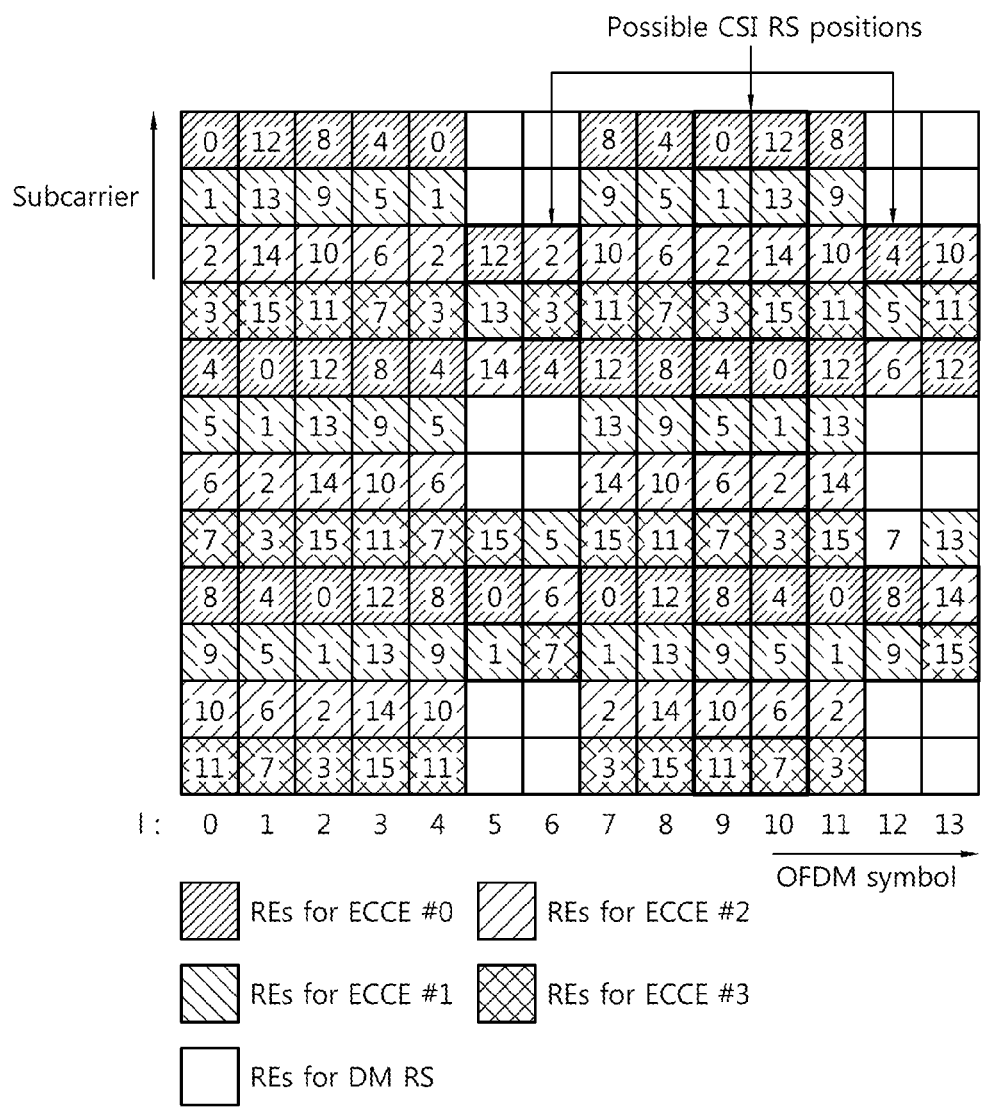
FIG. 8 illustrates an example of pairs of Physical Resource Blocks (PRBs).

FIG. 8 illustrates an example of a Physical Resource Block (PRB) pair. Each PRB is hereinafter assumed to include 7 OFDM symbols and 12 subcarriers, but the number of OFDM symbols and the number of subcarriers are only exemplary.

In a single subframe, a PRB pair includes 168 REs. 16 EREGs are formed using 144 REs other than 24 REs for DM-RSs. That is, a single EREG may include 9 REs. In this case, a CSI-RS or a CRS may be disposed in a single PRB pair in addition to the DM-RSs. In such a case, since the number of available REs is reduced, the number of REs included in a single EREG may also be reduced. The number of REs included in an EREG may be changed, but the number of EREGs included in a single PRB pair is not changed.

As illustrated in FIG. 8, RE indices may be sequentially assigned from the first subcarrier of a first OFDM symbols (1=0). It is assumed that indices of 0 to 15 are assigned to 16 EREGs. In this case, 9 REs having the RE index 0 is allocated to the EREG 0. Likewise, 9 REs corresponding to an RE index k (k=0, . . . , 15) are allocated to an EREG k.

An EREG is defined by grouping a plurality of EREGs. For example, if an EREG having 4 EREGs is defined, an EREG #0={an EREG 0, EREG 4, an EREG 8, an EREG 12}, an EREG #1={an EREG 1, an EREG 5, an EREG 9, an EREG 3}, an EREG #2={an EREG 2, an EREG 6, an EREG 10, an EREG 14}, and an EREG #3={an EREG 3, an EREG 7, an EREG 11, an EREG 15} may be defined. If an EREG having 8 EREGs is defined, an EREG #0={an EREG 0, an EREG 2, an EREG 4, an EREG 6, an EREG 8, an EREG 10, an EREG 12, an EREG 14}, and an EREG #1={an EREG 1, an EREG 3, an EREG 5, an EREG 7, an EREG 9, an EREG 11, an EREG 13, an EREG 15} may be defined.

As described above, an ECCE may include 4 EREGs in a normal CP, and an ECCE may include 8 EREGs in an extended CP. The ECCE is defined by an EREG. For example, FIG. 8 illustrates that an ECCE #0 includes an EREG #0, an ECCE #1 includes an EREG #1, an ECCE #2 includes an EREG #2, and an ECCE #3 includes an EREG #3.

ECCE-to-EREG mapping includes two types: localized transmission and distributed transmission. In the localized transmission, an EREG that forms a single ECCE is selected from an EREG within a single PRB pair. In the distributed transmission, an EREG that forms a single ECCE is selected from an EREG from different PRB pairs.

Figure 9:
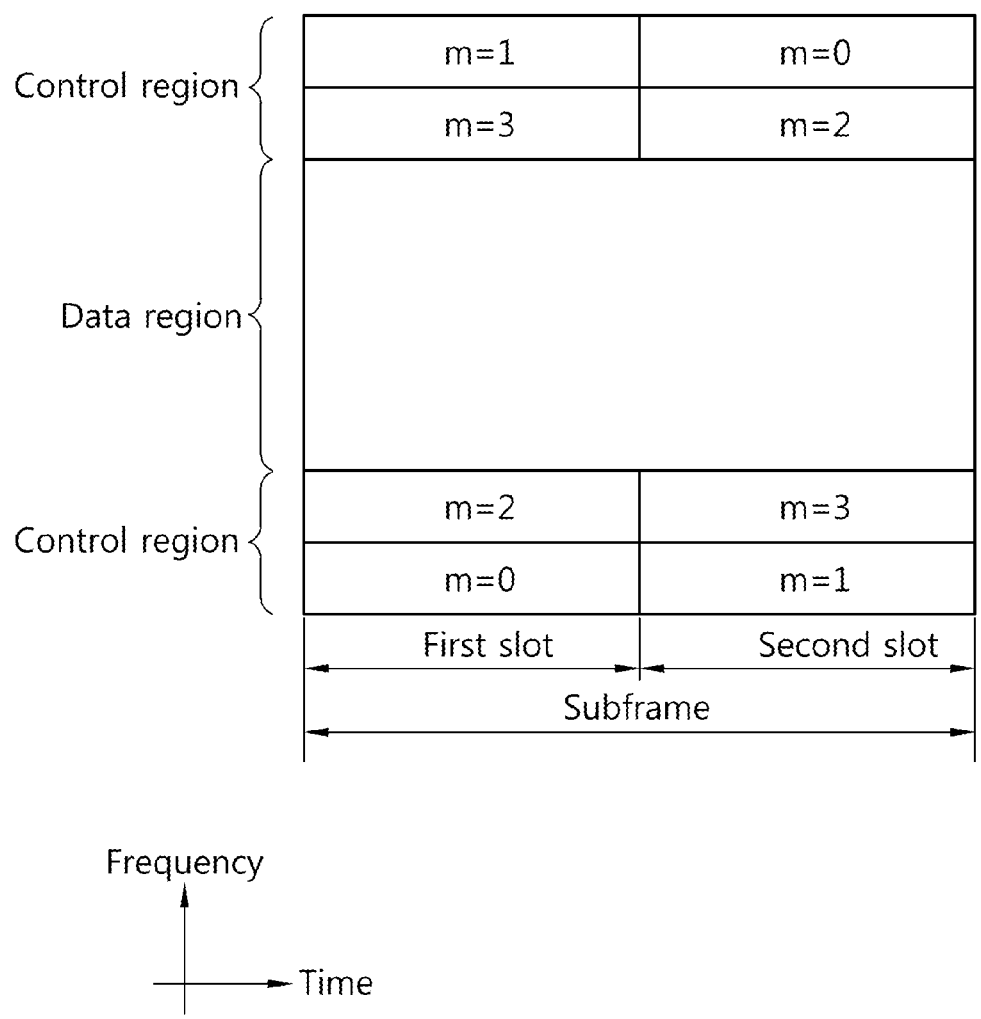
FIG. 9 illustrates the structure of an uplink subframe.

FIG. 9 illustrates the structure of an uplink subframe.

A UL subframe may be divided into a control region and a data region in a frequency domain. Physical uplink control channels (PUCCHs) on which uplink control information is transmitted are allocated to the control region. Physical uplink shared channels (PUSCHs) on which data is transmitted are allocated to the data region.

A PUCCH for a single piece of UE is allocated in the form of a single PRB pair in an subframe. RBs belonging to a single PRB pair occupy different subcarriers in a first slot and a second slot. A frequency occupied by RBs that belong to an RB pair allocated to a PUCCH is changed based on a slot boundary. This is said that a PRB pair allocated to a PUCCH has been frequency-hopped at the slot boundary. UE may obtain a frequency diversity gain by sending uplink control information through different subcarriers over time. m is a location index indicative of the logical frequency domain location of an RB pair allocated to a PUCCH in a subframe.

Uplink control information transmitted on a PUCCH includes Hybrid Automatic Repeat Request (HARQ) acknowledgement (ACK), a Channel Quality Indicator indicative of a DL channel state, and a Scheduling Request that is an uplink radio resource allocation request.

Meanwhile, a demand for a high data transfer rate is increased, and thus a Carrier Aggregation (CA) supporting a plurality of cells may be applied in 3GPP LTE-A. A CA may also be called another term, such as a bandwidth aggregation. A CA means that a wireless communication system forms a broadband by collecting one or more carriers each having a bandwidth smaller than a broadband, that is, a target, when trying to support the broadband. Carriers, that is, a target, when one or more carriers are collected, may use bandwidths used in an existing system for the purpose of backward compatibility with the existing system. For example, in 3GPP LTE, bandwidths, such as 1.4 MHz, 3 MHz, 5 MHz, 10 MHz, 15 MHz, and 20 MHz, may be supported. In 3GPP LTE-A, a broadband of 20 MHz or higher may be configured using only the bandwidths of a 3GPP LTE system. Alternatively, new bandwidths may be defined without using the bandwidths of existing systems, and a broadband may be configured using the new bandwidths.

A plurality of BSs and a plurality of pieces of UE may communicate with each other through a maximum of 5 cells. The 5 cells may correspond to a bandwidth of a maximum of 100 MHz. That is, a CA environment indicates that specific UE has two or more configured serving cells (hereinafter called cells) having different carrier frequencies. The carrier frequency indicates the center frequency of a cell.

A cell indicates a combination of DL resources and UL resources optionally. That is, a cell must include DL resources and may optionally include UL resources combined with the DL resources. The DL resource may be a DL Component Carrier (CC). The UL resource may be an UL CC. If specific UE has a single configured serving cell, it may have a single DL CC and a single UL CC. If specific UE has two or more cells, it may have DL CCs equal to the number of cells and UL CCs smaller than or equal to the number of cells. That is, if a CA is supported in current 3GPP LTE-A, the number of DL CCs may be always greater than or equal to the number of UL CCs. In contrast, releases subsequent to 3GPP LTE-A, a CA in which the number of DL CCs is smaller than the number of UL CCs may be supported.

Linkage between the carrier frequency of a DL CC and the carrier frequency of an UL CC may be indicated by system information transmitted on a DL CC. The system information may be System Information Block type2 (SIB2).

Figure 10:
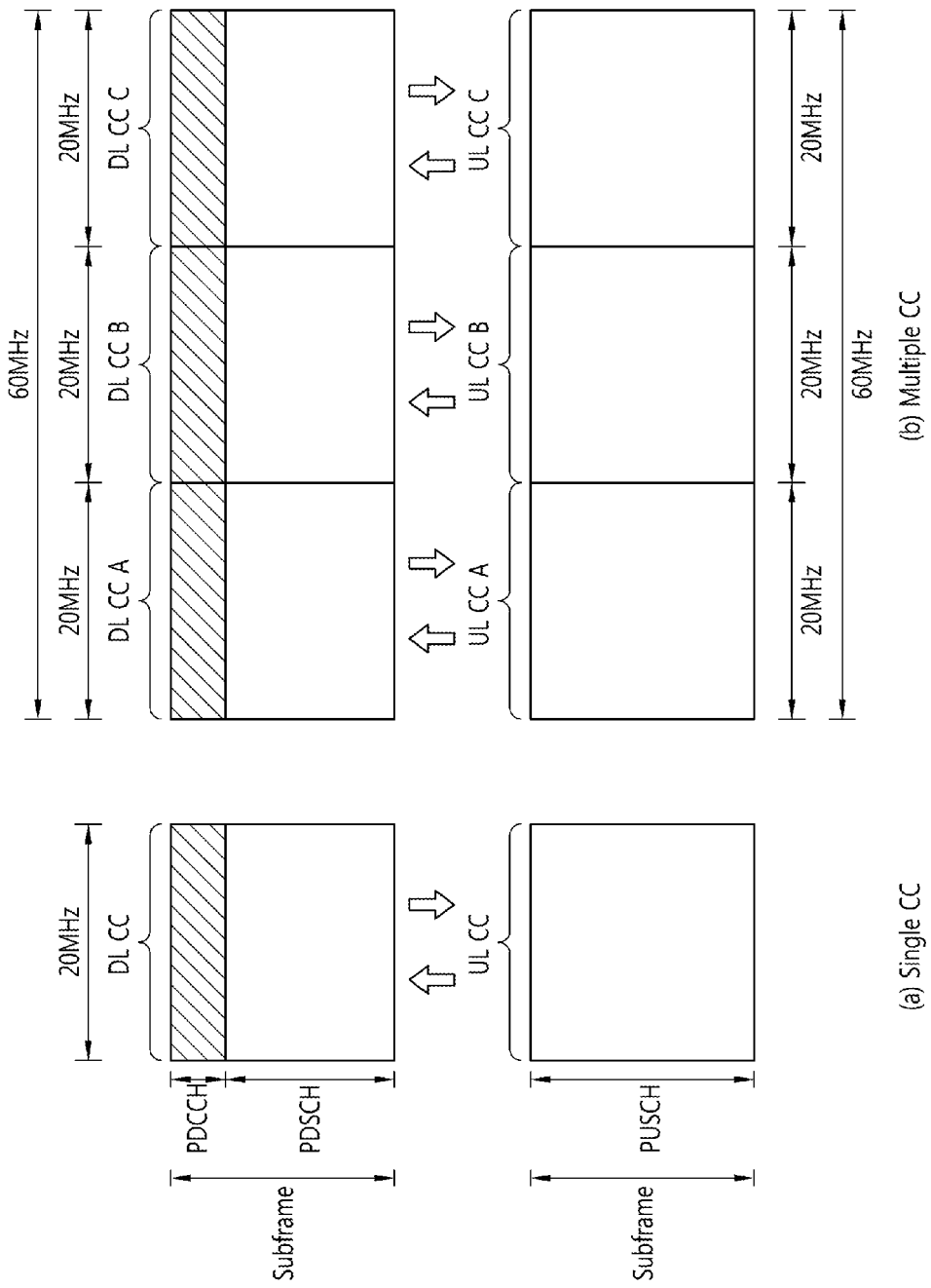
FIG. 10 illustrates an example of the structures of subframes of a single carrier system and a carrier aggregation system.

FIG. 10 illustrates an example of the structure of the subframes of a single carrier system and a carrier aggregation system.

FIG. 10-(a) illustrates a single carrier system. A system bandwidth of FIG. 10-(a) is assumed to be 20 MHz. Since the number of carriers is 1, each of the bandwidth of a DL CC transmitted by a BS and the bandwidth of an UL CC transmitted by UE is 20 MHz. The BS performs DL transmission through the DL CC, and the UE performs UL transmission through the UL CC.

FIG. 10-(b) illustrates a carrier aggregation system. A system bandwidth of FIG. 10-(b) is assumed to be 60 MHz. A downlink bandwidth includes a DL CC A, a DL CC B, and a DL CC C each having a bandwidth of 20 MHz. An uplink bandwidth includes an UL CC A, an UL CC B, and an UL CC C each having a bandwidth of 20 MHz. A BS performs DL transmission through the DL CC A, the DL CC B, and the DL CC C, and UE performs UL transmission through the UL CC A, the UL CC B, and the UL CC C. The DL CC A and the UL CC A, the DL CC B and the UL CC B, and the DL CC C and the UL CC C may correspond to each other.

A UE may monitor and/or receive a DL signal and/or data, transmitted through a plurality of DL CCs, at the same time. Although a cell manages N DL CCs, a BS may configure M DL CCs in cell-specific or UE-specific way so that UE monitors only a DL signal and/or data transmitted through the M DL CCs less than the N DL CCs. Furthermore, a BS may configure L DL CCs in a cell-specific way or UE-specific way so that UE preferentially monitors a DL signal and/or data, transmitted through the L DL CCs of M DL CCs.

UE supporting a CA may use a Primary cell (PCell) and one or more Secondary cells (SCell) for an increased bandwidth. That is, if two or more cells are present, a single cell becomes a PCell, and the remaining cells become SCells. Both the PCell and the SCell may become serving cells. UE in the RRC_CONNECTED state which does not support or cannot support a CA may have only a single serving cell including a PCell. UE in the RRC_CONNECTED state which supports a CA may have one or more serving cells including a PCell and all SCells.

A PCell may be a cell that operates in a primary frequency. A PCell may be a cell on which UE performs Radio Resource Control (RRC) connection with a network. A PCell may be a cell having the smallest cell index. A PCell may be a cell on which UE first attempts random access through a Physical Random Access Channel (PRACH), of a plurality of cells. A PCell may be a cell on which UE performs an initial connection establishment process or a connection re-establishment process in a CA environment. Alternatively, a PCell may be a cell indicated in a handover process. UE may obtain Non-Access Stratum (NAS) mobility information (e.g., a Tracking Area Indicator (TAI)) when performing RRC connection/reconfiguration/handover through a PCell. Furthermore, UE may obtain security input when performing RRC reconfiguration/handover through a PCell. UE may receive and send a PUCCH assigned thereto only in a PCell. Furthermore, UE may apply system information acquisition and system information change monitoring to only a PCell. A network may change the PCell of UE which supports a CA in a handover process using an RRCConnectionReconfiguration message including MobilityControlInfo.

An SCell may be a cell that operates in a secondary frequency. An SCell is used to provide additional radio resources. A PUCCH is not allocated to an SCell. When adding SCells, a network provides system information about a corresponding cell to UE in the RRC_CONNECTED state through dedicated signaling. A change of system information with respect to an SCell may be performed by the release and addition of a cell. A network may add, remove, or modify an SCell independently through an RRC connection re-establishment process using an RRCConnectionReconfiguration message.

LTE-A UE supporting a CA may send or receive one CC or a plurality of CCs at the same time depending on its capacity. LTE rel-8 UE may send or receive only a single CC when each of CCs forming a CA is compatible with an LTE rel-8 system. Accordingly, if the number of CCs used in uplink is at least the same as the number of CCs used in downlink, all the CCs need to be configured to be compatible with LTE rel-8. Furthermore, in order to efficiently use a plurality of CCs, the plurality of CCs may be managed in Media Access Control (MAC). If a CA is configured in DL, a receiver within UE needs to be able to receive a plurality of DL CCs. If a CA is configured in UL, a transmitter within UE needs to be able to send a plurality of UL CCs.

As a CA environment is introduced, cross-carrier scheduling may be applied. A PDCCH on a specific DL CC may schedule a PDSCH on any one of a plurality of DL CCs or schedule a PUSCH on any one of a plurality of UL CCs through cross-carrier scheduling. For cross-carrier scheduling, a Carrier Indicator Field (CIF) may be defined. A CIF may be included in a DCI format transmitted on a PDCCH. Whether or not the CIF is present in the DCI format may be indicated by an upper layer semi-statically or in a UE-specific way. When cross-carrier scheduling is performed, a CIF may indicate a DL CC on which a PDSCH is scheduled or an UL CC on which a PUSCH is scheduled. The CIF may have fixed 3 bits and may be present at a fixed location irrespective of the size of a DCI format. If a CIF is not present in a DCI format, a PDCCH on a specific DL CC may schedule PDSCHs on the same DL CC or schedule a PUSCH on an UL CC connected to the specific DL CC through SIB2.

If cross-carrier scheduling is performed using a CIF, a BS may assign a PDCCH monitoring DL CC aggregation in order to reduce the complexity of blind decoding by UE. The PDCCH monitoring DL CC aggregation is some of all DL CCs, and UE performs blind decoding on only PDCCHs within the PDCCH monitoring DL CC aggregation. That is, in order to schedule a PDSCH and/or a PUSCH in relation to the UE, a BS may send a PDCCH through only a DL CC within the PDCCH monitoring DL CC aggregation. The PDCCH monitoring DL CC aggregation may be configured in a UE-specific way, a UE group-specific way, or a cell-specific way.

Figure 11:
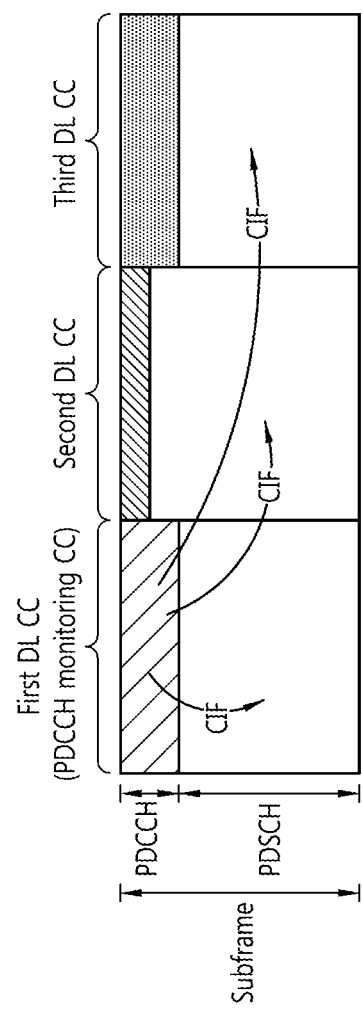
FIG. 11 illustrates an example of the structure of a subframe of a 3GPP LTE-Advanced (A) system that is subject to cross-carrier scheduling through a carrier indicator field.

FIG. 11 illustrates an example of the subframe structure of a 3GPP LTE-A system that is subjected to cross-carrier scheduling through a carrier indicator field.

Referring to FIG. 11, the first DL CC of 3 DL CCs is configured as a PDCCH monitoring DL CC. If cross-carrier scheduling is not performed, each of the DL CCs schedules a PDSCH in order to send each PDCCH. If cross-carrier scheduling is performed, only the first DL CC configured as the PDCCH monitoring DL CC sends the PDCCH. The PDCCH transmitted on the first DL CC schedules the PDSCHs of a second DL CC and a third DL CC using a CIF in addition to the PDSCH of the first DL CC. The second DL CC and the third DL CC not configured as the PDCCH monitoring DL CC do not send a PDCCH.

Meanwhile, cross-carrier scheduling is not supported for a PCell. That is, a PCell is always scheduled by its own PDCCH. The UL grant and DL assignment of a cell are always scheduled by the same cell. That is, if DL is scheduled on a second carrier in a cell, UL is also scheduled on a second carrier. A PDCCH order may be transmitted on only a PCell. Furthermore, in an aggregated cell, frame timing, Super Frame Number (SFN) timing, etc. may be aligned.

If an aggregation level on a PCell is 4 or 8, UE may monitor a single CSS. UE for which a CIF has not been set monitors a single USS if an aggregation level on an activated serving cell is any one of 1, 2, 4, and 8. UE for which a CIF has been set monitors one or more USSs if an aggregation level on one or more activated serving cells is any one of 1, 2, 4, and 8 as configured by an upper layer. The CSS and the USS may overlap with each other on the PCell.

UE in which a CIF associated with a PDCCH monitored in a serving cell has been set monitors a PDCCH which consists of a CIF in the USS of the serving cell and includes CRS scrambled by a C-RNTI. UE in which a CIF associated with a PDCCH monitored in a PCell has been set monitors a PDCCH which consists of a CIF in the USS of the PCell and includes CRC scrambled by an SPS C-RNTI. Furthermore, the UE may monitor the PDCCH by searching a CSS without a CIF. In relation to a serving cell in which a PDCCH is monitored, UE for which a CIF has not been set monitors a USS without a CIF for the PDCCH. UE for which a CIF has been set monitors a USS through a CIF for a PDCCH. If UE is configured to monitor a PDCCH in an SCell through a CIF in another serving cell, the UE may not monitor the PDCCH of the SCell.

Furthermore, UE may send uplink control information, such as Channel State Information (CSI) or an ACK/NACK signal received, detected, or measured from one or more DL CCs, to a BS through a predetermined single UL CC. The CSI may include a CQI, a PMI, an RI, etc. For example, if UE needs to send an ACK/NACK signal for data received from the DL CCs of a PCell and the DL CCs of an SCell, the UE may multiplex or bundle a plurality of ACK/NACK signals for the data received from each DL CC and send the plurality of ACK/NACK signals to a BS through the PUCCH of UL CCs of the PCell. In 3GPP LTE, if it is necessary to send an ACK/NACK signal for a DL CC, the following three cases are present.

1) An ACK/NACK signal for the transmission of a PDSCH indicated by a corresponding PDCCH in a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for a common PDSCH is transmitted.

2) An ACK/NACK signal for the PDCCH of a subframe (n−k) indicative of the release of DL Semi-Persistent Scheduling (SPS) may be transmitted in a subframe n. k∈K, and K is an M element aggregation $\{k_0, k_1, \ldots, k_{M-1}\}$ according to the subframe n and an UL/DL configuration. An ACK/NACK signal for a PDCCH indicative of the activation of DL SPS is not transmitted.

3) An ACK/NACK signal for the transmission of a PDSCH not including a PDCCH corresponding to a subframe (n−k) may be transmitted in a subframe n. k∈K, and K is an M element aggregation $\{k_0, k_1, \ldots, k_{M-1}\}$ according to the subframe n and an UL/DL configuration. This corresponds to a case where an ACK/NACK signal for SPS is transmitted.

In the above description, K is called a bundling window. That is, the bundling window refers to one or more DL subframes corresponding to an ACK/NACK signal in a single UL subframe. A wireless communication system may be basically divided into a Frequency Division Duplex (FDD) method and a Time Division Duplex (TDD) method. In accordance with the FDD method, uplink transmission and downlink transmission are performed while occupying different frequency bands. In accordance with the TDD method, uplink transmission and downlink transmission are performed at different times while occupying the same frequency band. In the case of an FDD system, M=1 and K={k0}={4}. Table 5 illustrates an example of a set K in a TDD system.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, a subframe using only an EPDCCH without using a PDCCH may be defined. A carrier type using only an EPDCCH is hereinafter also called a New Carrier Type (NCT). However, the NCT may include an existing LTE subframe including PDCCHs. Furthermore, the NCT may be applied to all the subframes, but may be applied to only a special subframe, such as a Multicast-Broadcast Single Frequency Network (MBSFN) subframe, or a DL subframe of an SCell in a CA environment. Things that need to be changed in existing LTE systems in order to use the NCT are described below.

1. Determining a Transport Block Size (TBS)

In accordance with a current LTE specification, the transport block size of a PDSCH in a normal CP is assumed to be 12 OFDM symbols. In the NCT, however, an EPDCCH and a PDSCH may be started at the first OFDM symbols of respective subframes because a PDCCH may not be transmitted. Accordingly, if a PDCCH is not transmitted, all the 14 OFDM symbols of each subframe may be used to carry the PDSCH. In such a case, a TBS in the NCT may be increased by about 15% compared to a TBS in an existing carrier type.

Furthermore, in the NCT, there is a subframe in which a CRS is not transmitted. Compared to a case where a CRS is transmitted in all the subframes in an existing carrier type, in the NCT, a CRS may be transmitted every five subframes, that is, in a cycle of 5 ms. In the NCT, a CRS may not be used to demodulate a PDSCH, but may be used for only tracking and may be called a Tracking Reference Signal (TRS). Since CRS overhead in a single port is about 5%, a difference between resource elements that may be used for PDSCH transmission between an existing subframe and an NCT subframe in which a CRS is not transmitted is about a maximum of about 20%.

Meanwhile, referring to Paragraph 7.1.7 of 3GPP TS 36.213 V10.4.0, a TBS is calculated by the following process.

1. $N'_{PRB}$ is set as the number of allocated PRBs. The number of allocated PRBs is based on Paragraph 7.6 of 3GPP TS 36.213 V10.4.0.

2. (1) If a transport block is transmitted in the DwPTS of a special subframe in a frame structure type 2, that is, in a radio frame structure for TDD, the column indicator $N_{PRB}$ in Table 7.1.7.2.1-1 is set as in Equation 5 below.

$$N_{PRB} = \max\{\lfloor N'_{PRB} \times 0.75 \rfloor, 1\} \quad \text{[Equation 5]}$$

In Equation 5, max{a,b} means a greater value of a and b, $\lfloor d \rfloor$ is the greatest integer equal to or smaller than d, and '0.75' is a scaling factor.

(2) If not, the column indicator $N_{PRB}$ in Table 7.1.7.2.1-1 is set as in Equation 6 below.

$$N_{PRB} = N'_{PRB} \quad \text{[Equation 6]}$$

The present invention proposes that the aforementioned process is changed as follows.

1. $N''_{PRB}$ is set as the number of allocated PRBs. The number of allocated PRBs is based on Paragraph 7.6 of 3GPP TS 36.213 V10.4.0.

2. (1) If a transport block is transmitted in an NCT subframe, (1-1) If a PDSCH is started at an OFDM symbol #0, that is, a first OFDM symbol, (1-1-1) If a CRS is not transmitted, $N'_{PRB}$ is set as in Equation 7 below.

$$N'_{PRB} = \min\{\lfloor N'_{PRB} \times c \rfloor, N_{RB}^{DL}\} \quad \text{[Equation 7]}$$

In Equation 7, c=1.20, min{a,b} is a smaller value of a and b, $\lfloor d \rfloor$ is the greatest integer equal to or smaller than d, and $N_{RB}^{DL}$ is a downlink bandwidth configuration represented as a multiple of the size of a resource block.

(1-1-2) If not, $N'_{PRB}$ is set as in Equation 8 below.

$$N'_{PRB} = \min\{\lfloor N'_{PRB} \times c \rfloor, N_{RB}^{DL}\} \quad \text{[Equation 8]}$$

In Equation 8, c=1.15, min{a,b} is a smaller value of a and b, $\lfloor d \rfloor$ is the greatest integer equal to or smaller than d, and $N_{RB}^{DL}$ is a downlink bandwidth configuration represented as a multiple of the size of a resource block.

(1-2) If not, (1-2-1) If a CRS is not transmitted, $N'_{PRB}$ is set as in Equation 9 below.

$$N'_{PRB} = \min\{\lfloor N_{PRB} \times c \rfloor, N_{RB}^{DL}\} \quad \text{[Equation 9]}$$

In Equation 9, c=1.05, min{a,b} is a smaller value of a and b, and $N_{RB}^{DL}$ is a downlink bandwidth configuration represented as a multiple of the size of a resource block.

(2) If not, $N'_{PRB}$ is set as in Equation 10 below.

$$N'_{PRB} = N''_{PRB} \quad \text{[Equation 10]}$$

3. (1) If a transport block is transmitted in the DwPTS of a special subframe in a frame structure type 2, that is, a radio frame structure for TDD, the column indicator $N_{PRB}$ of Table 7.1.7.2.1-1 is set as in Equation 11 below.

$$N_{PRB} = \max\{\lfloor N'_{PRB} \times 0.75 \rfloor, 1\} \quad \text{[Equation 11]}$$

In Equation 11, max {a,b} is a greater value of a and b, $\lfloor d \rfloor$ is the greatest integer equal to or smaller than d, and '0.75' is a scaling factor.

(2) If not, the column indicator $N_{PRB}$ of Table 7.1.7.2.1-1 is set as in Equation 12 below.

$$N_{PRB} = N'_{PRB} \quad \text{[Equation 12]}$$

In accordance with the aforementioned process, a TBS is differently determined depending on whether or not a transport block is transmitted in an NCT subframe and whether or not the start point of a PDSCH and a CRS are included in the NCT subframe if the transport block is transmitted in the NCT subframe. For example, if a transport block is transmitted in an NCT subframe, the NCT subframe does not include a CRS, and a PDSCH is started at the first OFDM symbol of the NCT subframe, resources increased by about 20% are incorporated into the selection of a TBS.

Meanwhile, in accordance with a current LTE specification, a timing gap for switching from a DL subframe to an UL subframe is required for a radio frame for TDD. To this end, a special subframe is present between the DL subframe and the UL subframe, and various types of special subframe configurations are supported depending on channel conditions and the location of UE. Table 5 is an example of a special subframe configuration.

In the case of a special subframe, a scaling factor for determining a transport block size may be changed based on the location of an OFDM symbol where a PDSCH is started. In accordance with a current LTE specification, the scaling factor is '0.75' in a special subframe configuration other than Confs 0 and 5 in a normal CP or Confs 0 and 4 in an extended CP. In an NCT special subframe, a PDCCH may not be included and a PDSCH may be started at the first OFDM symbol. Accordingly, in the NCT special subframe, OFDM symbols available for PDSCH transmission may be increased from 8-11 to 11-14 in the normal CP. If the number of OFDM symbols obtained based on the calculation of a TBS in an existing carrier type is equal to or greater than 12, the scaling factor may be increased to '1' and the following options may be selected.

Option 1: If a PDSCH is started at the first OFDM symbol of an NCT special subframe, a scaling factor '1' is applied in all the special subframe configurations other than Confs 0 and 5 in a normal CP or Confs 0 and 4 in an extended CP.

Option 2: If a PDSCH is started at the first OFDM symbol of an NCT special subframe, a scaling factor '0.75' is applied in Confs 1 and 6 and a scaling factor '1' is applied in Confs 2, 3, 4, 7, and 8.

Option 3: If the number of OFDM symbols used for PDSCH transmission is equal to or greater than 12, a scaling factor '1' is applied regardless of the start point of a PDSCH. If not, a scaling factor '0.75' is applied.

In the aforementioned options, in a subframe in which a CRS is not transmitted, an additional scaling factor '0.05' may be applied based on the start point of a PDSCH and the type of subframe (e.g., a normal subframe or a special subframe).

The Conf 9 subframe in a normal CP or the Conf 7 subframe in an extended CP that is started at the first OFDM symbol may use only 6 OFDM symbols of 12 OFDM symbols. Accordingly, as another option, '0.5' may be applied to the scaling factor of Conf 9 in a normal CP or the scaling factor of Conf 7 in an extended CP.

Meanwhile, in the scheduling of an EPDCCH multiplexed with a PDSCH, downlink data may be subject to rate-matching with an EPDCCH including DCI that schedules a PDSCH. In such a case, in determining a TBS, the start point of an OFDM symbol for the PDSCH or EPDCH and/or the number of PRBs for the DCI that schedules the PDSCH may be taken into consideration.

TABLE 5

| Special subframe configuration | Normal CP (DL) | | | Extended CP (DL) | | |
| --- | --- | --- | --- | --- | --- | --- |
| | | UpPTS | | | UpPTS | |
| | DwPTS | Normal CP (UL) | Extended CP (UL) | DwPTS | Normal CP (UL) | Extended CP (UL) |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |
| 9 | $24144 \cdot T_s$ | | | — | — | — |

In this case, $T_s = 1/(15000 \times 2048)$. From Table 5, it may be seen that the DwPTS and the UpPTS are different depending on the normal CP or the extended CP.

In accordance with the TBS table and CIF of release 10, a BS may handle a difference of 15-20% attributable to the CIF (e.g., a difference a case where the CIF is 1 and a case where the CIF is 3 in a system having a system bandwidth of 6 RBs). Accordingly, the BS may assume that it may handle dynamic situation changes of a maximum of 15%.

In a dynamic situation in which the start point of an OFDM symbol for an EPDCCH and the number of PRBs are changed, the following methods of determining a TBS may be used.

Method 1:

(1) $N''_{PRB}$ is set as the number of allocated PRBs. The number of allocated PRBs is based on Section 7.6 of 3GPP TS 36.213 V10.4.0.

(2-1) If $$K_c = \left(|\text{Starting\_Symbol} - 3| \times \alpha - \frac{N_{rm}}{N''_{PRB}} \times \beta\right) \geq C_{thresh},$$

$$N'_{PRB} = \min\{\lfloor N''_{PRB} \times K_c \rfloor, N_{RB}^{DL}\}$$

In this case, $\alpha$ is a constant, such as 0.7, $\beta$ is a constant of 0.5 or higher, such as 1.0, Starting_symbol is an OFDM symbol index (e.g., 0, 1, 2, ...) indicative of the start point of a PDSCH, $N_{rm}$ is the number of PRBs used in an EPDCCH overlapped with the PDSCH, $C_{thresh}$ is a threshold value, such as 0.15, 0.2, or 0.25, min{a,b} is a smaller value of a and b, $\lfloor d \rfloor$ is the greatest integer equal to or smaller than d, and $N^{DL}_{RB}$ is a downlink bandwidth configuration represented as a multiple of the size of a resource block.

(2-2) If not, $$N'_{PRB} = N''_{PRB}$$

Method 1a:

(1) $N''_{PRB}$ is set as the number of allocated PRBs. The number of allocated PRBs is based on Section 7.6 of 3GPP TS 36.213 V10.4.0.

(2-1) If $$K_c = \left(|\text{Starting\_Symbol} - 3| \times \alpha - \frac{N_{rm}}{N''_{PRB}} \times \beta\right) \geq C_{thresh},$$

$$N'_{PRB} = \min\{\lfloor N''_{PRB} \times K_c \rfloor, N_{RB}^{DL}\}$$

In this case, $\alpha$ is a constant, such as 0.7, $\beta$ is a constant of 0.5 or higher, such as 1.0, Starting_symbol is an OFDM symbol index (e.g., 0, 1, 2, ...) indicative of the start point of a PDSCH, $N_{rm}$ is the number of PRBs used in an EPDCCH overlapped with the PDSCH, $C_{thresh}$ is a threshold value, such as 0.15, 0.2, or 0.25, min{a,b} is a smaller value of a and b, $\lfloor d \rfloor$ is the greatest integer equal to or smaller than d, and $N_{RB}^{DL}$ is a downlink bandwidth configuration represented as a multiple of the size of a resource block (2-2) If $$\frac{N_{rm}}{N''_{PRB}} \times \beta \geq C_{thresh},$$

however, $$N'_{PRB} = \min\{N''_{PRB} - N_{rm}, N_{RB}^{DL}\}$$

In this case, $\beta$ is a constant of 0.5 or higher, such as 1.0, $N_{rm}$ is the number of PRBs used in an EPDCCH overlapped with a PDSCH, $C_{thresh}$ is a threshold value, such as 0.15, 0.2, or 0.25, min{a,b} is a smaller value of a and b, and $N_{RB}^{DL}$ is a downlink bandwidth configuration represented as a multiple of the size of a resource block.

(2-3) If not, $$N'_{PRB} = N''_{PRB}$$

Method 2:

(1) $N''_{PRB}$ is set as the number of allocated PRBs. The number of allocated PRBs is based on Section 7.6 of 3GPP TS 36.213 V10.4.0.

(2-1) If a transport block is transmitted in an NCT subframe in which a PDSCH is started at the first OFDM symbol (and/or a CRS used for tracking is not transmitted), $$N'_{PRB} = \min\{\lfloor (N''_{PRB} - N_{rm}) \times c \rfloor, N_{RB}^{DL}\}$$

In this case, $N_{rm}$ is the number of PRBs used in an EPDCCH overlapped with the PDSCH, c is 1, 1.2, 1.25, or 1.3, min{a,b} is a smaller value of a and b, $\lfloor d \rfloor$ is the greatest integer equal to or smaller than d, and $N^{DL}_{RB}$ is a downlink bandwidth configuration represented as a multiple of the size of a resource block.

(2-2) If not, $$N'_{PRB} = \min\{N''_{PRB} - N_{rm}, N^{DL}_{RB}\}$$

In this case, $N_{rm}$ is the number of PRBs used in an EPDCCH overlapped with the PDSCH, min{a,b} is a smaller value of a and b, and $N^{DL}_{RB}$ is a downlink bandwidth configuration represented as a multiple of the size of a resource block.

Method 2a:

(1) $N''_{PRB}$ is set as the number of allocated PRBs. The number of allocated PRBs is based on Section 7.6 of 3GPP TS 36.213 V10.4.0.

(2-1) If a transport block is transmitted in an NCT subframe in which a PDSCH is started at the first OFDM symbol (and/or a CRS used for tracking is not transmitted), $$N'_{PRB} = N''_{PRB}$$

(2-2) If not, $$N'_{PRB} = \min\{N''_{PRB} - N_{rm}, N_{RB}^{DL}\}$$

In this case, $N_{rm}$ is the number of PRBs used in an EPDCCH overlapped with the PDSCH, min{a,b} is a smaller value of a and b, and $N^{DL}_{RB}$ is a downlink bandwidth configuration represented as a multiple of the size of a resource block.

Method 3:

(1) $N''_{PRB}$ is set as the number of allocated PRBs. The number of allocated PRBs is based on Section 7.6 of 3GPP TS 36.213 V10.4.0.

(2-1) If $$\frac{N_{rm}}{N''_{PRB}} \times \beta \geq C_{thresh},$$

$$N'_{PRB} = \min\{N''_{PRB} - N_{rm}, N_{RB}^{DL}\}$$

In this case, $\beta$ is a constant of 0.5 or higher, such as 1.0, $N_{rm}$ is the number of PRBs used in an EPDCCH overlapped with the PDSCH, $C_{thresh}$ is a threshold value, such as 0.15, 0.2, or 0.25, min{a,b} is a smaller value of a and b, and $N^{DL}_{RB}$ is a downlink bandwidth configuration represented as a multiple of the size of a resource block.

(2-3) If not, $$N'_{PRB} = N''_{PRB}$$

Figure 12:
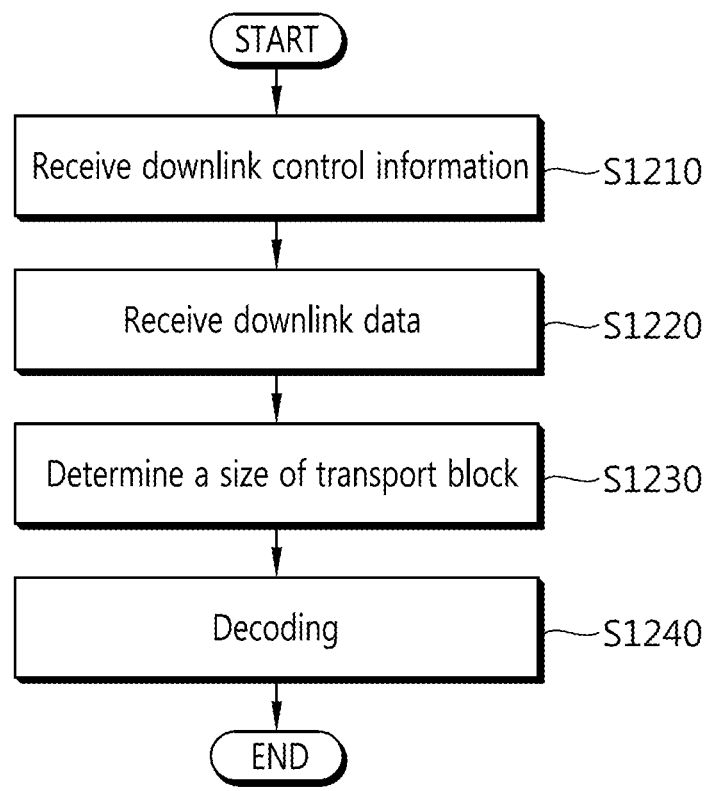
FIG. 12 illustrates a method of receiving downlink data in accordance with an embodiment of the present invention.

FIG. 12 illustrates a method of receiving downlink data in accordance with an embodiment of the present invention. In the following embodiment, it is assumed that a subframe of an existing carrier type is used in a PCell and an NCT subframe is used in an SCell.

UE receives downlink control information from a PCell (S1210). For convenience of description, a subframe which the downlink control information is received from the PCell is called a first subframe.

The UE receives downlink data from an SCell (S1220). The downlink data may be received through a PDSCH and may be scheduled through the downlink control information received in the first subframe. That is, the downlink control information may include information for cross-carrier scheduling. Furthermore. a subframe in which the downlink data is received is called a second subframe in order to distinguish the first subframe from the subframe in which the downlink data is received.

The UE may determine a transport block size based on a carrier type of the second subframe (S1230). That is, the UE may determine a transport block size based on whether or not the second subframe is an NCT subframe, whether or not the second subframe includes a reference signal for channel measurement, whether or not the second subframe is a special subframe in a TDD system and/or whether or not a PDSCH is started at the first OFDM symbol of the second subframe. A detailed process of determining a transport block size has been described above The UE decodes the PDSCH based on the downlink control information and the transport block size (S1240). For this, reference may be made to 3GPP TS 36.213 V10.4.0.

2. Rate Matching Between SPS PDSCH and an EPDCCH Set

As described above, an NCT subframe may be configured to use only an EPDCCH without using a PDCCH. A PRB set may be configured so that UE monitors an EPDCCH, which is called an EPDCCH set $\complement$.

In the aforementioned equations, $N_{rm}$ may have the following options.

The number of PRBs of an EPDCCH overlapped with PRBs of a PDSCH allocated by DCI The number of PRBs of an EPDCCH set overlapped with PRBs of a PDSCH allocated by DCI (including the DCI)

If an SPS PDSCH is transmitted, a TBS not including DCI that schedules a PDSCH may be predicted based on the most recent SPS PDSCH transmission. In this case, for a flexible use of SPS PDSCH scheduling using an EPDCCH, the following methods may be taken into consideration for a USSS EPDCCH.

Option 1: An SPS PDSCH is subject to rate-matching with the periphery of a PRB configured as an EPDCCH set. This may be indicated by validation/activation DCI, an EPDCCH set including the DCI, or higher layer signaling. The option may be constrained to be used only when the EPDCCH set is a distributed EPDCCH set.

Option 2: An SPS PDSCH is subject to rate-matching with the periphery of a PRB configured as a first EPDCCH set or a second EPDCCH set.

Option 2a: An SPS PDSCH is subject to rate-matching with the periphery of a PRB configured as a specific EPDCCH set. The option may be constrained to be used only when the EPDCCH set is a distributed EPDCCH set.

Option 3: An SPS PDSCH is not subject to rate-matching with the periphery of a PRB configured as an EPDCCH set.

Option 4: Validation/activation DCI for an SPS PDSCH may be subject to rate-matching with a PRB in which SPS transmission is expected. That is, the SPS PDSCH is subject to rate-matching with the periphery of a PRB where UE has found validation/activation DCI.

Option 5: The same PRBs subjected to rate-matching with a subframe having the same type as a current subframe type in the most recent SPS PDSCH transmission is assumed to be subject to rate-matching with a current SPS PDSCH.

Meanwhile, for a CSS EPDCCH for an SPS PDSCH or a PDSCH scheduled by DCI,

A PDSCH is subject to rate-matching with the periphery of a PRB configured as an EPDCCH set allocated to a CSS.

A PDSCH is not subject to rate-matching with the periphery of a PRB configured as an EPDCCH set allocated to a CSS.

A PDSCH is subject to rate-matching only when UE finds DCI of a CSS EPDCCH set on a PRB in which CSS DCI and a PDSCH are overlapped.

Furthermore, if UE is configured to be one or more (distributed) EPDCCH sets, the following cases may be taken into consideration.

(1) If validation/activation DCI is scheduled through a PDCCH and an SPS PDSCH is successfully transmitted in a subframe in which an EPDCCH is monitored, Option 1, Options 2/2a, and Option 3 may be applied based on a subframe. That is, if an SPS PDSCH is transmitted in an EPDCCH monitoring subframe, the assumption applied in each option may be applied in the subframe. Alternatively, if UE is configured to be an EPDCCH set regardless of the location where activation DCI is transmitted (e.g., depending on a PDCCH monitoring subframe or an EPDCCH monitoring subframe), Options 1, 2, and 3 may be applied. For example, if Option 2 is used for rate-matching around a first EPDCCH set, it may be assumed that the same PRB is subject to rate-matching regardless of the type of a subframe.

If Option 4 is used, rate-matching in an EPDCCH monitoring subframe is not performed.

If Option 5 is used, rate-matching in an EPDCCH monitoring subframe is not performed.

(2) If validation/activation DCI is scheduled through an EPDCCH, successive SPS PDSCHs may be transmitted in a PDCCH monitoring subframe.

SPS PDSCH rate-matching is taken into consideration in an EPDCCH monitoring subframe. In a PDCCH monitoring subframe, however, SPS PDSCH rate-matching around an EPDCCH region is not assumed. That is, regardless of rate-matching in an EPDCCH monitoring subframe, rate-matching around an EPDCCH set is not assumed in the PDCCH monitoring subframe.

Alternatively, the same PRB set is assumed to be subject to rate-matching regardless of an EPDCCH or a PDCCH monitoring subframe. That is, the rate-matched PRB set may follow a rate-matching pattern determined by a validation/activation DCI scheduling PDSCH.

(3) Activation and successive PDSCHs are transmitted in an EPDCCH monitoring subframe.

(4) Activation and successive PDSCHs are transmitted in a PDCCH monitoring subframe:

If Option 1 or Options 2/2a are assumed, in a PDCCH monitoring subframe, i. the same assumption is applied. That is, in the PDCCH monitoring subframe, rate-matching around an EPDCCH set is performed.

ii. Alternatively, in Option 1 or Option 2, rate-matching may be applied only in an EPDCCH monitoring subframe.

If Option 4 or Option 5 is used, rate-matching is not assumed.

In summary, if rate-matching is applied, two options are possible: (1) rate-matching is applied regardless of a PDCCH or an EPDCCH monitoring subframe. (2) rate-matching is applied based on a subframe. That is, rate-matching may be applied to only an EPDCCH monitoring subframe.

In particular, if Option 5 is used, rate-matching around an EPDCCH is not performed in a PDCCH monitoring subframe, but is performed in an EPDCCH monitoring subframe. Accordingly, a rate-matching pattern in the EPDCCH monitoring subframe follows the most recent SPS PDSCH transmitted in an EPDCCH subframe.

Furthermore, rate-matching may be set in each subframe by a high layer. For example, if a subframe is configured to perform rate-matching around an EPDCCH set, a PDSCH may be subject to rate-matching with the periphery of an EPDCCH.

3. CSI Feedback Assumption in an NCT

In an existing carrier type, CSI reference is included in resource elements used for PDCCH transmission because a PDCCH transmitted in the first 3 OFDM symbols of a subframe are not transmitted. As another method, CSI reference resources are configured based on a parameter $l_{DataStart}$ indicative of a PDSCH start OFDM symbol that may be configured by a high layer.

It is assumed that a resource element allocated to a reference signal transmitted in a specific subframe for time/frequency tracking is not present.

It is assumed that a resource element allocated for a PDCCH and an EPDCCH, that is, another control channel, is not present.

If CQI estimation is performed using a reference signal transmitted for time/frequency tracking, UE receives information about the transmission power of the reference signal transmitted for time/frequency tracking and a power offset to be applied upon CQI estimation from a BS and uses the information in CQI estimation. In this case, information about PDSCH transmission power may be given as a ratio of PDSCH power to the power of the reference signal transmitted for time/frequency tracking or a ratio of the Energy Per Resource Element (EPRE) of a PDSCH to the EPRE of the reference signal transmitted for time/frequency tracking.

4. A PDSCH Transmission Method Assumed in CSI Reference Resources

In a PDSCH transmission method that is assumed in CSI reference resources, a CQI is estimated using a CSI-RS assuming a transmission method for performing demodulation using a URS in the case of an NCT. However, the amount of CSI feedback can be reduced using channel reciprocity because the same frequency is used in downlink and uplink in the case of TDD. In order to support a CSI feedback method that may use channel reciprocity, whether or not a PMI/RI is fed back is configured by a high layer. If a PMI/RI is transmitted, transport mode 9 in which 8 layers can be transmitted is assumed in a PDSCH transmission method for CSI reference resources.

If a PMI/RI is not transmitted, PDSCH transmission using a single antenna port may be assumed in a PDSCH transmission method for CSI reference resources. In this case, the same antenna port as an antenna port through which a reference signal used for time/frequency tracking is transmitted is used as the antenna port of a PDSCH. As another method, PDSCH transmission using a single antenna port is assumed. In such a case, however, a specific antenna port (e.g., port 7) of a URS may be assumed, and an average CQI value to which all PMIs defined for feedback have been applied may be transmitted as a CSI feedback value.

Figure 13:
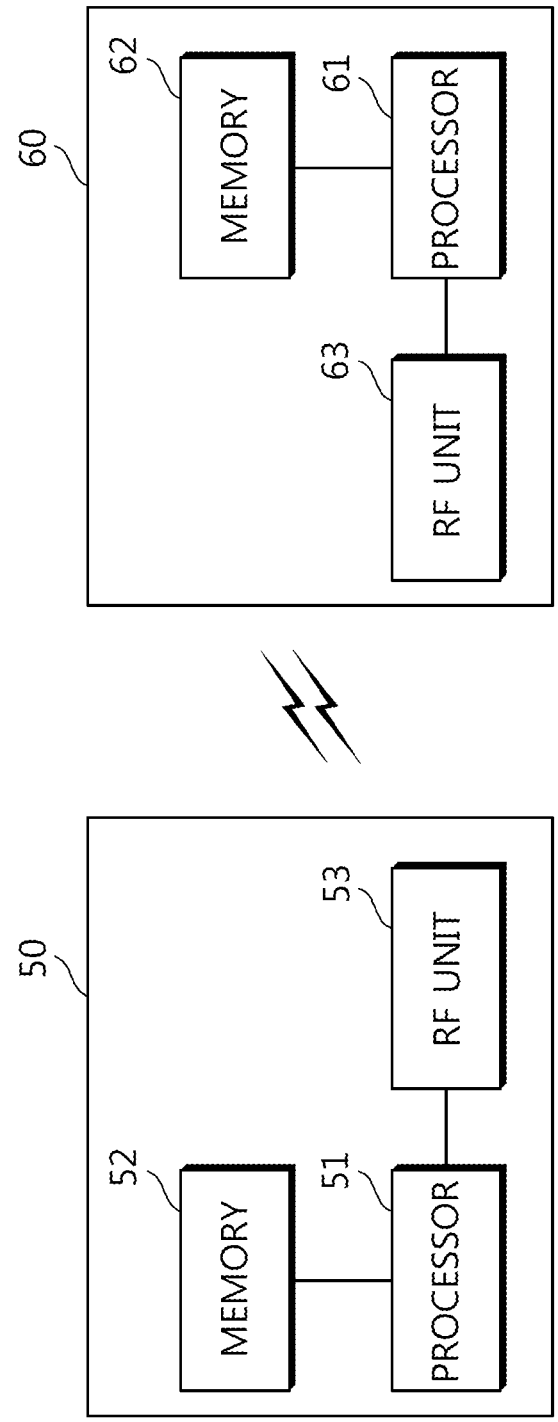
FIG. 13 is a block diagram illustrating a wireless communication system in which an embodiment of the present invention is implemented.

FIG. 13 is a block diagram illustrating a wireless communication system in which an embodiment of the present invention is implemented.

A BS 50 includes a processor 51, memory 52, and a Radio Frequency (RF) unit 53. The memory 52 is connected to the processor 51 and stores various pieces of information for driving the processor 51. The RF unit 53 is connected to the processor 51 and sends and/or receives radio signals. The processor 51 implements the proposed functions, processes and/or methods. In the aforementioned embodiments, the operation of the BS may be implemented by the processor 51.

UE 60 includes a processor 61, memory 62, and an RF unit 63. The memory 62 is connected to the processor 61 and stores various pieces of information for driving the processor 61. The RF unit 63 is connected to the processor 61 and sends and/or receives radio signals. The processor 61 implements the proposed functions, processes and/or methods. In the aforementioned embodiments, the operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving downlink data in a wireless communication system, the method comprising:
    receiving downlink control information in a first subframe from a primary cell;
    receiving downlink data in a second subframe through a physical downlink shared channel (PDSCH) from a secondary cell;
    determining a transport block size based on a carrier type of the second subframe; and
    decoding the PDSCH based on the downlink control information and the transport block size.

2. The method of claim 1, wherein the transport block size is determined based on a position of an Orthogonal Frequency Division Multiplexing (OFDM) symbol of the second subframe at which the decoding of the PDSCH is started.

3. The method of claim 2, wherein determining the transport block size comprises obtaining a number of resource blocks $N''_{PRB}$ to which the downlink data has been allocated, and wherein if the decoding of the PDSCH is started at a first OFDM symbol of the second subframe, the transport block size is determined based on $N'_{PRB}$ determined based on an equation as below:

$$N'_{PRB}=\min\{\lfloor N'_{PRB} \times c \rfloor, N_{RB}^{DL}\}$$

where c=1.15, min{a,b} is a smaller value of a and b, $\lfloor d \rfloor$ is a greatest integer equal to or smaller than d, and $N_{RB}^{DL}$ is a downlink bandwidth configuration represented as a multiple of a size of a resource block.

4. The method of claim 1, wherein the transport block size is determined based on whether or not the second subframe includes a reference signal for channel measurement.

5. The method of claim 4, wherein determining the transport block size comprises obtaining a number of resource blocks $N''_{PRB}$ to which the downlink data has been allocated, and wherein if the second subframe includes the reference signal for the channel measurement, the transport block size is determined based on $N'_{PRB}$ determined based on an equation as below:

$$N'_{PRB}=\min\{\lfloor N'_{PRB} \times c \rfloor, N_{RB}^{DL}\}$$

where c=1.05, min{a,b} is a smaller value of a and b, $\lfloor d \rfloor$ is a greatest integer equal to or smaller than d, and $N_{RB}^{DL}$ is a downlink bandwidth configuration represented as a multiple of a size of a resource block.

6. The method of claim 1, wherein the transport block size is determined based on a position of an Orthogonal Frequency Division Multiplexing (OFDM) symbol of the second subframe at which the decoding of the PDSCH is started and whether or not the second subframe includes a reference signal for channel measurement.

7. The method of claim 6, wherein determining the transport block size comprises a step of obtaining a number of resource blocks $N''_{PRB}$ to which the downlink data has been allocated, and wherein if the PDSCH is started at a first OFDM symbol of the second subframe and the second subframe includes the reference signal for the channel measurement, the transport block size is determined based on $N'_{PRB}$ determined based on an equation as below:

$$N'_{PRB}=\min\{\lfloor N'_{PRB} \times c \rfloor, N_{RB}^{DL}\}$$

where c=1.2, min{a,b} is a smaller value of a and b, $\lfloor d \rfloor$ is a greatest integer equal to or smaller than d, and $N_{RB}^{DL}$ is a downlink bandwidth configuration represented as a multiple of a size of a resource block.

8. The method of claim 6, wherein the reference signal for the channel measurement is a Tracking Reference Signal (TRS) transmitted every 5 ms.

9. The method of claim 1, wherein the second subframe is a special subframe in a Time Division Duplex (TDD) system, and wherein the transport block size is determined based on a special subframe configuration of the second subframe and a position of an Orthogonal Frequency Division Multiplexing (OFDM) symbol of the second subframe at which the decoding of the PDSCH is started.

10. The method of claim 1, wherein the second subframe is a special subframe in a Time Division Duplex (TDD) system, and wherein the transport block size is determined based on a number of Orthogonal Frequency Division Multiplexing (OFDM) symbols used to send the PDSCH.

11. A user equipment (UE) in a wireless communication system, the UE comprising:
a radio frequency unit configured to transmit and receive radio signals; and
a processor connected to the radio frequency unit and configured to:
receive downlink control information in a first subframe from a primary cell;
receive downlink data in a second subframe through a physical downlink shared channel (PDSCH) from a secondary cell;
determine a transport block size based on a carrier type of the second subframe; and
decode the PDSCH based on the downlink control information and the transport block size.

12. The UE of claim 11, wherein the transport block size is determined based on a position of an Orthogonal Frequency Division Multiplexing (OFDM) symbol of the second subframe at which the decoding of the PDSCH is started.

13. The UE of claim 11, wherein the transport block size is determined based on whether or not the second subframe includes a reference signal for channel measurement.

14. The UE of claim 11, wherein the transport block size is determined based on a position of an Orthogonal Frequency Division Multiplexing (OFDM) symbol of the second subframe at which the decoding of the PDSCH is started and whether or not the second subframe includes a reference signal for channel measurement.

15. The UE of claim 14, wherein the reference signal for the channel measurement is a Tracking Reference Signal (TRS) transmitted every 5 ms.

16. The UE of claim 11, wherein the second subframe is a special subframe in a Time Division Duplex (TDD) system, and wherein the transport block size is determined based on a special subframe configuration of the second subframe and a position of an Orthogonal Frequency Division Multiplexing (OFDM) symbol of the second subframe at which the decoding of the PDSCH is started.

17. The UE of claim 11, wherein the second subframe is a special subframe in a Time Division Duplex (TDD) system, and wherein the transport block size is determined based on a number of Orthogonal Frequency Division Multiplexing (OFDM) symbols used to send the PDSCH.

* * * * *